United States Patent [19]

Lewis

[11] Patent Number: 5,755,036
[45] Date of Patent: May 26, 1998

[54] COMPASS DEVICE WITH LIGHT ATTENUATING MASK

[76] Inventor: W. Stan Lewis, 709 Mar Vista Dr., Vista, Calif. 92083

[21] Appl. No.: 687,187

[22] Filed: Jul. 25, 1996

[51] Int. Cl.$^6$ .......................... G01C 17/02; G01C 17/26
[52] U.S. Cl. .................. 33/355 R; 33/360; 33/363 K
[58] Field of Search .................... 33/355 R, 360, 33/363 K, 364, 344, 345, 346, 349, 363 R, DIG. 3

[56] References Cited

U.S. PATENT DOCUMENTS

| | | |
|---|---|---|
| 3,128,386 | 4/1964 | Hughes. |
| 4,047,168 | 9/1977 | Fowler. |
| 4,117,602 | 10/1978 | Lapeyre ........................ 33/363 K |
| 4,577,414 | 3/1986 | Migliori ........................ 33/363 K |
| 4,720,631 | 1/1988 | Lapeyre ........................ 250/231 SE |
| 4,958,072 | 9/1990 | Hofler et al. .................. 33/363 K |
| 5,079,845 | 1/1992 | Childers ........................ 33/355 R |
| 5,448,835 | 9/1995 | Lewis ............................ 33/355 R |
| 5,469,630 | 11/1995 | Lewis ............................ 33/355 R |

*Primary Examiner*—Christopher W. Fulton
*Attorney, Agent, or Firm*—Tom Hamill, Jr.

[57] ABSTRACT

An apparatus is disclosed which is utilized to provide positional information relative to an external magnetic field. The apparatus includes a rotatably mounted slotted disk wherein the slot is continuously varying in width around the circumference of the disk. The continuously variable width of the slot serves as a light attenuating mask. The disk incorporates an elongated magnet means which causes it to rotate in relation to an external magnetic field. The slotted disk may be placed in a fluid filled chamber. A first and second aperture are located on the top and bottom of the chamber, the apertures defining an emission passage through the chamber. The apertures have a rectangular length approximately the maximum width of the slot. The slotted disk is intermediate the apertures. A source detector, source emitter and an area source means is provided. The area source means is caused to emit a continuous uniform light signal which is attenuated by the slotted disk. The area source provides a uniform light intensity across the apertures. This provides the source detector means with a meaningful signal. In the disclosed embodiments, the source detector does not directly see the emanations from the primary source emitter, hence, it is not neccessary that the source detector be sensitive to the primary source emanations.

20 Claims, 15 Drawing Sheets

COMPASS DEVICE WITH LIGHT ATTENUATING MASK

BACKGROUND OF THE INVENTION

1. Field of the Invention

The present invention relates generally to directional information devices, such as compasses, and more particularly, to a compasses of the light attenuation variety. This compass utilizes a emission detection means - emitter means with a compass card having a light transmission slot intermediate an area source. The area source will provide a uniform intensity emission which will be detected by the emission detection means.

2. Description of the Prior Art

Compasses which utilize a rotating disk with a light attenuating means are known in the art. U.S. Pat. No. 5,448,835 issued to Lewis teaches a Compass Device. This compass incorporates a compass card intermediate a light source and a photon detector means. The compass card has an emission transmission slot which varies in width, the light transmission slot attenuating the light emission mechanically in such a manner where the instantaneous emission intensity transmitted therethrough itself gives directional information which is processed to an output. Lewis teaches that the emission source is directly detected by the detection means.

U.S. Pat. No. 5,469,630 also issued to Lewis teaches a Gimballed Compass Device which employs an emission attenuating disk intermediate an emission source and a detector means. The device is gimballed and includes means to detect directional information in three dimensions, coupling inclination-declination with a compass readout. Lewis teaches that the emission source is directly detected by the detection means.

Other compass devices which utilize a rotating disk with a light attenuation means located thereon have been disclosed in the form of an optical shaft encoder and are well known in the art.

A typical example of such a device is U.S. Pat. No. 4,117,602 issued to Lapeyre. This device incorporates a light emitting diode to illuminate a series of tracks on a coded disk. The tracks located on the coded disk are a plurality of alternating light transmissive and light opaque regions which represent one bit of a multiple bit digital code. A sensor array senses the light transmitted through the disk as the disk is rotated by a magnet means and through appropriate signal processing is able to decode the signals into directional information.

Other means to derive information from a light source and a compass card is shown in U.S. Pat. No. 4,577,414 to Migliori et al. This device includes a compass disk which is rotatable and has a magnet means and a light polarizing means located thereon. A light beam is split into a plurality of beams two of which pass through a first polarizing means and two of which pass through a second polarizing means, the second polarizing means having their optical axes at right angles to the first polarizing means. By comparison of the ratio of the intensities of the beams which pass through the polarizing means one may determine the angle of the magnet means in relation to a fixed axis of the compass body.

U.S. Pat. No. 4,720,631 issued to Lapeyre discloses a compass card which has a linear photodetector array in a spatial relation with a light source. Intermediate the photodetector array and the light source is a rotating disk with slots located thereon. As the disk rotates the light is passed through the slots in such a manner that the linear photodetector array may detect a certain or specific random pattern of illumination which corresponds to a specific disk position. The signals generated by the photodetector array are decoded on the basis of a unique positional calibration stored in a read-only-memory and then output to the user.

The instant invention are improved embodiments of the aforementioned Lewis devices. The aforementioned Lewis devices do not teach the placement of the emission detector and the emission source in a parallel, side by side relationship. Nor was it taught to place a diffuse reflector means or a fluorescent material at the bottom terminus of the emission channel directly underneath emission detector and the emission source. Other embodiments will be presented which vary the position of the light emission means to give advantage in the manufacturing process.

The other body of prior art indicates it to be well known to use encoder disks mounted on shafts and other means to determine position by utilizing digitizing means and polarization means, the provision of a more simple and cost effective electronic compass device which may be mass produced and utilized by the common man is not contemplated. Nor does the prior art described above teach or suggest a simple compass device which utilizes a compass card having a light transmission slot which varies in width whereby the light transmission slot attenuates the light intensity mechanically in such a manner where the instantaneous light intensity transmitted therethrough itself gives positional information.

The foregoing disadvantages are overcome by the unique compass card of the present invention as will be made apparent from the following description thereof. Simplicity is evident over the prior art in that the response function is a linear function of the source emission intensity striking one or more detectors as described herein. The linearity is determined by the source detector means employed, the source detector being selected to have a linear response to the incident intensity. Further, neither expensive polarizing sheets or fiber optic cables are need nor are extensive read-only-memory to store positional correlation information. Other advantages of the present invention over the prior art also will be rendered evident.

SUMMARY OF THE INVENTION

To achieve the foregoing and other advantages several embodiments of the instant invention will be considered. One of the principal features of this invention is that the source detector does not see the direct emission from the emission source.

A first embodiment of the present invention includes a compass device which is utilized to provide positional information relative to an external magnetic field. The apparatus includes a rotatably mounted slotted disk wherein the slot is continuously varying in width around the circumference of the disk. The disk incorporates an elongated magnet means which causes the disk to rotate in relation to an external magnetic field. The slotted disk is mounted on a mount which permits the disk to rotate freely. A cylindrical chamber surrounds the slotted disk, the cylindrical chamber has a top element, a bottom element, and a side element. The slotted disk may be placed in a fluid filled chamber. The fluid acts as a damping means. A first and second aperture are located on the top and bottom of the chamber, the apertures defining an emission passage through the chamber. The apertures have a rectangular length approximately the maximum width of the slot. The slotted disk is positioned intermediate the apertures with the slot located within the emission passage. A first detector is provided proximal an emission source, both the first detector and emission source are located above the first aperture of the chamber. The first detector will act as a reference detector. The first detector generates a signal proportional to that of the unattenuated emission source. A second detector is also located above the first aperture of the chamber. The second detector generates a signal proportional to the attenuated reflected emission. A diffuse reflector is located below the second aperture of the chamber. The emission source generates an emission which travels through the emission passage. The emission is diffusely reflected back through the emission passage where the reflected diffuse reflection is attenuated by the slot of the disk. The diffuse reflector acts as an area source. The second detector provides a response proportional to the intensity of emission incident upon it. As the disk rotates the linearly variable width of the slot attenuates the emission which has been diffusely reflected. The absolute position of the disk is thus determinable from the intensity of the attenuated reflected emission received by the second detector and the intensity of the emission received by the first detector. Such a device would be utilized as an extremely accurate compass which would include a digital display output.

A second embodiment of the present invention includes a compass device which is utilized to provide positional information relative to an external magnetic field. The apparatus includes a rotatably mounted slotted disk wherein the slot is continuously varying in width around the circumference of the disk. The disk incorporates an elongated magnet means which causes the disk to rotate in relation to an external magnetic field. The slotted disk is mounted on a mount which permits the disk to rotate freely. A cylindrical chamber surrounds the slotted disk, the cylindrical chamber has a top element, a bottom element, and a side element. The slotted disk may be placed in a fluid filled chamber. The fluid acts as a damping means. A first and second aperture are located on the top and bottom of the chamber, the apertures defining an emission passage through the chamber. The apertures have a rectangular length approximately the maximum width of the slot. The slotted disk is positioned intermediate the apertures with the slot located within the emission passage. An emission source and the second detector are located above the first aperture of the chamber. The second detector generates a signal proportional to the attenuated fluorescent emission. A fluorescent material is located below the second aperture of the chamber. A first detector is located proximal the fluorescent material. The first detector will act as a reference detector. The first detector generates a signal proportional that of the unattenuated fluorescent emission source. The emission source generates an emission which travels through the emission passage. The emission excites the fluorescent material, causing it to fluoresce thus emitting a generally uniform radiation back through the emission passage where it is attenuated by the slot of the disk. The fluorescent material, when excited, acts as an area source. The second source detector provides a response proportional to the intensity of the attenuated fluorescent emission incident upon it. As the disk rotates the linearly variable width of the slot attenuates the fluorescent emission which has been emitted from the fluorescent material. The absolute position of the disk is thus determinable from the intensity of the attenuated fluorescent emission received by the second emission detector and the intensity of the fluorescent emission received by the first detector. Such a device would be utilized as an extremely accurate compass which would include a digital display output.

The third embodiment of the present invention includes a compass device which is utilized to provide positional information relative to an external magnetic field. The apparatus includes a rotatably mounted slotted disk wherein the slot is continuously varying in width around the circumference of the disk. The disk incorporates an elongated magnet means which causes the disk to rotate in relation to an external magnetic field. The slotted disk is mounted on a mount which permits the disk to rotate freely. A cylindrical chamber surrounds the slotted disk, the cylindrical chamber has a top element, a bottom element, and a side element. The slotted disk may be placed in a fluid filled chamber. The fluid acts as a damping means. A first and second aperture are located on the top and bottom of the chamber, the apertures defining an emission passage through the chamber. The apertures have a rectangular length approximately the maximum width of the slot. The slotted disk is positioned intermediate the apertures with the slot located within the emission passage. A first detector is provided proximal an emission source, both the first detector and emission source are located below the second aperture of the chamber. The first detector will act as a reference detector. The first detector generates a signal proportional that of the unattenuated emission source. A second detector is located above the first aperture of the chamber. The second detector generates a signal proportional to the attenuated reflected emission. A diffuse reflector is located below the second aperture of the chamber. The emission source generates an emission which is diffusely reflected through the emission passage where the reflected diffuse reflection is attenuated by the slot of the disk. The diffuse reflector acts as an area source. The second detector provides a response proportional to the intensity of emission incident upon it. As the disk rotates the linearly variable width of the slot attenuates the emission which has been diffusely reflected. The absolute position of the disk is thus determinable from the intensity of the attenuated reflected emission received by the second detector and the intensity of the emission received by the first detector. Such a device would be utilized as an extremely accurate compass which would include a digital display output.

The fourth embodiment of the present invention includes a compass device which is utilized to provide positional information relative to an external magnetic field. The apparatus includes a rotatably mounted slotted disk wherein the slot is continuously varying in width around the circumference of the disk. The disk incorporates an elongated magnet means which causes the disk to rotate in relation to an external magnetic field. The slotted disk is mounted on a mount which permits the disk to rotate freely. A cylindrical chamber surrounds the slotted disk, the cylindrical chamber has a top element, a bottom element, and a side element. The slotted disk may be placed in a fluid filled chamber. The fluid acts as a damping means. A first and second aperture are located on the top and bottom of the chamber, the apertures defining an emission passage through the chamber. The apertures have a rectangular length approximately the maximum width of the slot. The slotted disk is positioned intermediate the apertures with the slot located within the emission passage. A second detector is located above the first aperture of the chamber. The second detector generates a signal proportional to the attenuated fluorescent emission. A fluorescent material is located below the second aperture of the chamber. An emission source and a first detector is located proximal the fluorescent material. The first detector will act as a reference detector. The first detector generates a signal proportional that of the unattenuated fluorescent emission source. The first and second detection means will be chosen to be susceptible to fluorescent emissions. The emission source generates an emission which excites the fluorescent material, causing it to fluoresce thus emitting a generally uniform radiation back through the emission passage where it is attenuated by the slot of the disk. The fluorescent material, when excited, acts as an area source. The second source detector provides a response proportional to the intensity of the attenuated fluorescent emission incident upon it. As the disk rotates the linearly variable width of the slot attenuates the fluorescent emission which has been emitted from the fluorescent material. The absolute position of the disk is thus determinable from the intensity of the attenuated fluorescent emission received by the second emission detector and the intensity of the fluorescent emission received by the first detector. Such a device would be utilized as an extremely accurate compass which would include a digital display output.

THE TRITIUM EMBODIMENT

The fifth embodiment of the present invention includes a compass device which is utilized to provide positional information relative to an external magnetic field. The apparatus includes a rotatably mounted slotted disk wherein the slot is continuously varying in width around the circumference of the disk. The disk incorporates an elongated magnet means which causes the disk to rotate in relation to an external magnetic field. The slotted disk is mounted on a mount which permits the disk to rotate freely. A cylindrical chamber surrounds the slotted disk, the cylindrical chamber has a top element, a bottom element, and a side element. The slotted disk may be placed in a fluid filled chamber. The fluid acts as a damping means. A first and second aperture are located on the top and bottom of the chamber, the apertures defining an emission passage through the chamber. The apertures have a rectangular length approximately the maximum width of the slot. The slotted disk is positioned intermediate the apertures with the slot located within the emission passage. A second detector is located above the first aperture of the chamber. The second detector generates a signal proportional to the attenuated tritium decay induced emission. A Tritium compound is placed in a lattice of material which emits an attenuatable emission when in the presence of tritium decay products, primarily beta particles. The tritium lattice is generally shaped as a rectangular panel, approximating the size of the apertures. The tritium material is located below the second aperture of the chamber. A first detector is located proximal the tritium panel. The first detector will act as a reference detector. The first detector generates a signal proportional that of the unattenuated tritium decay induced emission. The tritium panel, through beta decay, generates an emission which excites the lattice material, causing it to fluoresce thus emitting a generally uniform radiation back through the emission passage where it is attenuated by the slot of the disk. The lattice material, when excited, acts as an area source. The second source detector provides a response proportional to the intensity of the attenuated uniform radiation emission incident upon it. As the disk rotates the linearly variable width of the slot attenuates the emission which has been emitted from the lattice material. The absolute position of the disk is thus determinable from the intensity of the attenuated lattice emission received by the second emission detector and the intensity of the unattenuated emission received by the first detector. Such a device would be utilized as an extremely accurate compass which would include a digital display output.

The ouroboros is an archaic term applied to a tail biting dragon or serpent and is used to symbolize circumference or eternity. In the context of this disclosure it is used as a noun to describe a right triangle where the hypotenuse and the side opposite are pulled at the apex of the angle which joins them in a full circle, the apex so rotated then contacts the side opposite that apex at the base of the right angle. A similar construct can be made from any triangle or trapezium resulting in a linear change in area, thus attenuation, per unit of angle. It is evident that shape of the mask can be fabricated to provide for non-linear attenuation functions also and may be constructed to match a particular detectors response function. The term ouroboros is used to describe the continuously varying width (CVW) slot of the slotted disk and will be referred to as such below.

Other embodiments employing more than one continuously variable width (CVW) slot have been considered. By employing concentric ouroboros slots one may increase angular resolution of the compass device. It will be understood that multiple concentric ouroboros slots will require additional detector-emitter suites associated therewith, in a one to one ratio. Also, multiple co-circumferential ouroboros slots have been considered. Four ourobori may be placed head to tail every ninety degrees on the disk. Three ourobori may be placed head to tail every one hundred and twenty degrees. N ourobori may be placed head to tail every 360/N degrees. It will also be understood that multiple co-circumferential ourobori slots will require additional detector-emitter suites.

GENERAL THEORY OF OPERATION

All of the above described embodiments incorporate a rotatably mounted slotted disk on which is mounted an elongated magnet means. The slotted area of the disk forms a passage, this passage is proximal to the circumference of the disk. In all of the embodiments the CVW of the slot attenuates an emission. The location of the emission source is variable and will be described in further detail. This family of light attenuation devices will provide source emanations (whether reflected diffuse light, fluorescent light, or other radiation source) which acts as an area source. These emanations pass through the variable width slot in the rotatably mounted disk and strike the emission source detector. The source detector means is selected such that the response function of the detector is preferably linear, or otherwise well known, with respect to incident intensity upon it from the emission source. The slot width changes continuously and linearly as the disk rotates, and thus the slot area, such that the area source emanation intensity striking the area source detector is linearly attenuated as the disk rotates. This attenuation of the area source emission first intensity causes the detected area source emission to be detected as a second intensity, said second intensity described being less than the first. Variations in said second intensities relative to a reference (first) intensity are thus an indication of the orientation of the disk.

The discussion of the below preferred embodiments will fully illuminate the operation of the disclosed device.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will form the subject matter of the claims appended hereto.

In this respect, before explaining at least one preferred embodiment of the invention in detail, it is to be understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which this disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms of phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

This invention provides for directional information, as a compass, with respect to orientation in an external magnetic field. It is an object of the present invention to provide a low cost electronic orientation device with digital output sensitive to an external magnetic field having simple circuitry and logic.

It is a further object of this invention to provide a low cost directional orientation device for use where generally low orientation resolution is adequate. The orientation resolution is a function of the rate of change of width, thus area, of the slot which attenuates the source emission in relation to the response sensitivity of the source detector means employed.

It is another object of the present invention to provide a new an improved directional orientation device which may be easily and efficiently manufactured and marketed.

It is a further objective of the present invention to provide a new and improved directional orientation device which is of durable and reliable construction.

An even further object of the present invention is to provide a new and improved directional orientation device which is susceptible of a low cost of manufacture with regard to both materials and labor, and which accordingly is then susceptible of low prices of sale to the consuming public, thereby making such a directional orientation device readily available to the buying public.

Additional objects, advantages and novel features of the invention will be set forth in part in the description that follows, and in part will become apparent to those skilled in the art upon examining the following or may be learned by practice of the invention. These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawings wherein.

DESCRIPTION OF THE PREFERRED EMBODIMENT

To meet the aforementioned objectives the following descriptions of the preferred embodiments are disclosed.

FIRST EMBODIMENT

The first embodiment discusses the use of a diffuse reflector 48 providing a generally uniform intensity radiation reflection. The emission source 40 is located above the slotted disk 14.

Figure 1:
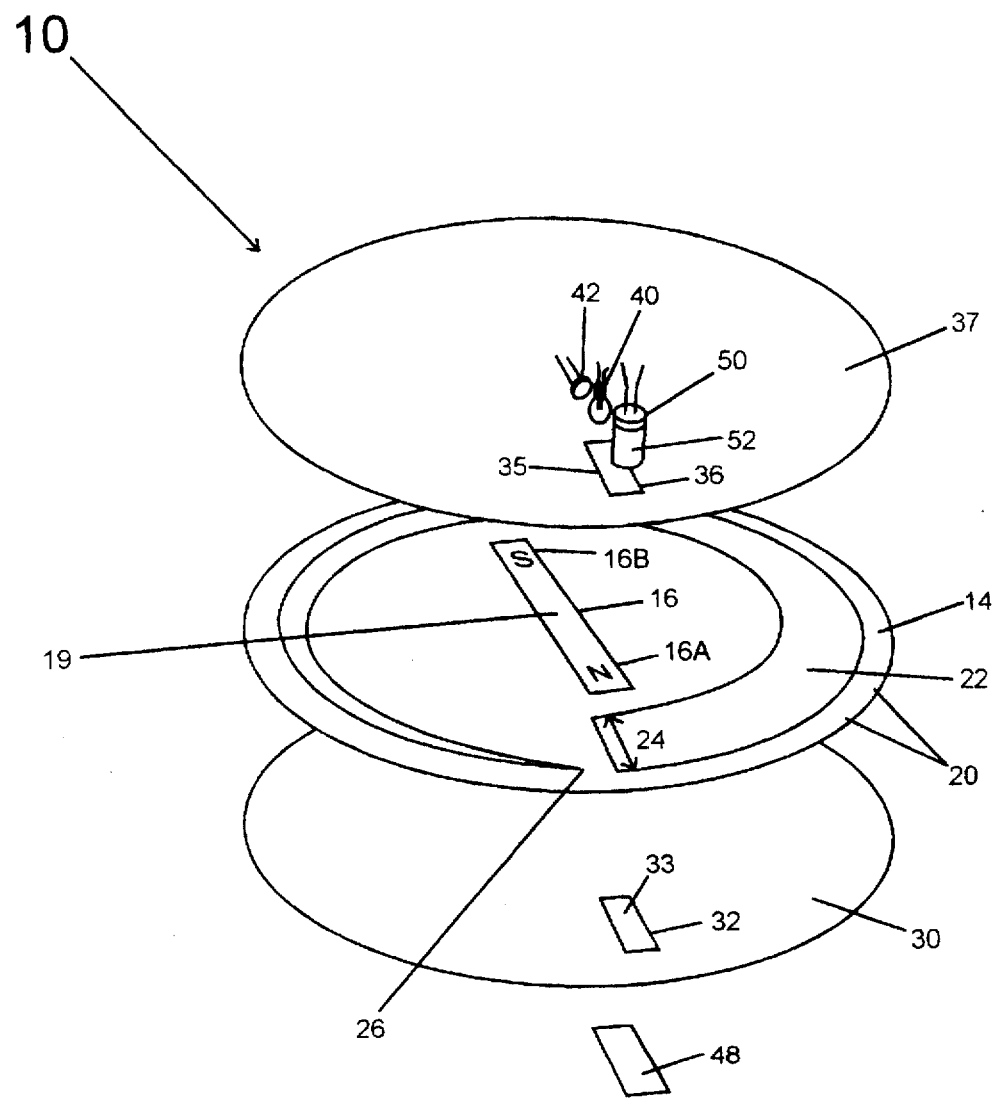
FIG. 1 presents an exploded view of the first embodiment of the invention. Illustrated is the rotatably mounted disc showing the relationship of the slot of continuously varying width and the fixed solid disk with rectangular aperture intermediate emitter - detector configuration.
Figure 2:
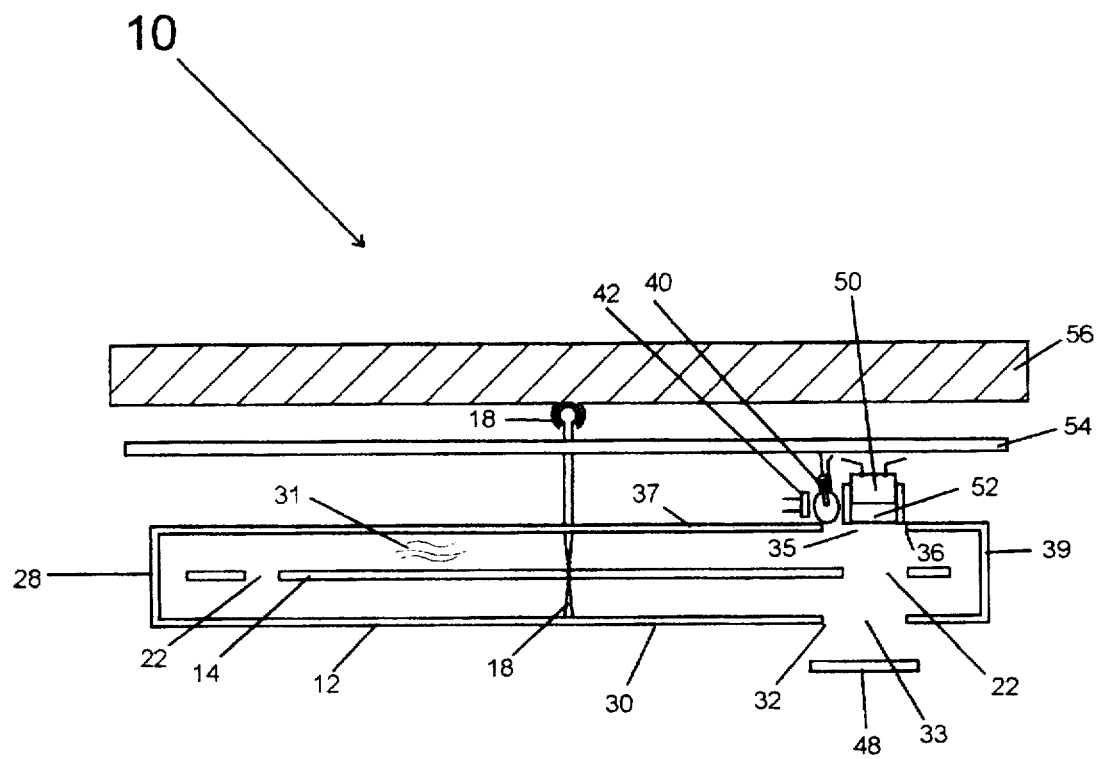
FIG. 2 presents a cross sectional view of the first embodiment illustrating a first placement of the location detector, the source emitter, the reference detector, the fluid dampened rotatably mounted disc and the compass housing.

Referring specifically now to FIGS. 1–2 the compass device 10 is shown. A housing 12 surrounds a slotted disk 14. The slotted disk 14 has an elongated permanent magnet 16 mounted thereon. The slotted disk 14 includes a mounting means 18 which would suspend the slotted disk in such a fashion to permit it to freely rotate. The slotted disk has a center 19 and a circumference 20. A slot 22 is provided generally about the circumference 20 which defines a passage through the slotted disk 14. The slot 22 has a maximum width 24 and a minimum width 26. The slot 22 varies in width as the slot 22 circumscribes the circumference 20 of the slotted disk 14. No two slot 22 widths are the same and the width becomes smaller from the maximum width 24 to the minimum width 26. The slot 22 approximates the shape of an ouroboros or an elongated triangular element which has been scribed about the circumference of the slotted disk 14.

The permanent magnet 16 has a north direction 16A and a south position 16B. The magnet 16 may be orientated in such a fashion where the north direction 16A is facing the point of maximum width 24 on the slot 22 in a radial fashion.

The slotted disk 14 is centrally supported inside a cylindrical inner housing 28. The mounting means 18 permits free rotation of the slotted disk 14. The cylindrical inner housing 28 has a bottom element 30 is fixed below the slotted disk 14. The bottom element 30 is equivalent geometrically to the slotted disk 14, and shares an equivalent radius, circumference, diameter etc. A first aperture 32 is located on the bottom element 30. The first aperture 32 is rectangular and is orientated radially on the bottom element 30, the aperture's minimum rectangular dimension being approximately parallel to the circumference of the bottom element 30. The first aperture 32 length is equivalent to the maximum width 24 of the slot 22.

The inner housing 28 forms a chamber which is filled with a fluid 31. The fluid 31 is surrounded by a bottom element 30, a top element 37 and a side element 39 forming a cylindrical chamber. The fluid 31 damps the rotation of the slotted disk 14. The fluid 31 is also transparent to the emission, i.e. the fluid 31 permits the transmission of the emission without significantly degrading the emission's intensity. A first transparent membrane 33 covers the first rectangular aperture 32.

A second transparent membrane 35 covers a second aperture 36 located on the top element 37 of the inner housing 28. The second aperture 36 is also approximately rectangular, and has an appropriate orientation, preferably radially with its lesser dimension parallel to the circumference of the cylindrical inner housing 28. The greater dimension would approximate that of the maximum width 24 of the slot 22.

An emission source 40 is located above the top element 37. This emission source 40 may be a radioactive source, a light source, a laser source, an infrared or near infrared source, or any other known emission source. A first detector 42 is proximal the emission source 40. The first detector 42 may be collimated. The first detector 42 produces a reference value which relates to the unattenuated emission intensity. The first detector 42 may be a radiation detector, a laser detector, an infrared or near infrared detector, or any other appropriate detector device, such as a charged coupled device. The first detector 42 is chosen in such a manner to permit detection of the emission source 40. The first detector 42 will generate a unattenuated signal which will be used as a reference value for emission intensity prior to attenuation. The function of the first detector 42 is to provide this reference intensity signal for comparison to the attenuated signal. Such a unattenuated signal is to correct for changes in emission intensity with time due to battery drain, ambient temperature, or other physical conditions which may alter the inherent emission intensity.

The slotted disk 14, bottom element 30, as well as the top aperture 36 and the bottom aperture 32 lay intermediate the emission source 40 and a diffuse reflector 48. The diffuse reflector 48 is a rough surface reflector and does not reflect light specularly. Rather, the diffuse reflector 48 acts as a general area source producing a generally uniform radiation intensity reflection across an area. This diffuse reflection will be detected by the second detector 50. The second detector 50 is fixed above slot 22. A collimator 52 may be provided proximal the second detector 50. The collimator 52 collimates the attenuated emission from the diffuse reflector 48 and channels the collimated, attenuated portion of the emission into the second detector 50. The collimator 52 also insures that stray emanations other than those from the emission source do not interfere with the disk location determination. The emission is first rectangularly attenuated by the aperture 32 located on the bottom element 30. The emission is further attenuated by the slot 22 of the slotted disk 14. As the slotted disk 14 rotates due to the interaction of the elongated permanent magnet 16 with an external magnetic field, the slot 22 moves in relation to the second detector 50. As the slot 22 width varies with the slot 22 position about the circumference, different amounts of the emission are attenuated as a function of slotted disk 14 position. The second detector 50 produces a signal representing an attenuated value which relates to the attenuated emission intensity.

Element 54 relates to a standard circuit board. Element 56 relates to an outer housing for the device.

The comparison of the reference value with the attenuated value gives directional information and will be discussed below in greater detail.

It is to be understood that means to power an appropriate emission source 40, such as batteries for a radiation source, have been considered desirable. Also, a light bulb which may be detected by a cadmium sulfide photoresisitive detector may be employed, both of these elements are susceptible to extremely low cost and are currently commercially available. Solar power has been to determined to be an appropriate power source for several of the embodiments included herein.

SECOND EMBODIMENT

The second embodiment discusses the use of a fluorescent source 148 providing a generally uniform intensity radiation emission due to excitation by the emission source 140. The emission source 140 is located above the slotted disk 114.

Figure 3:
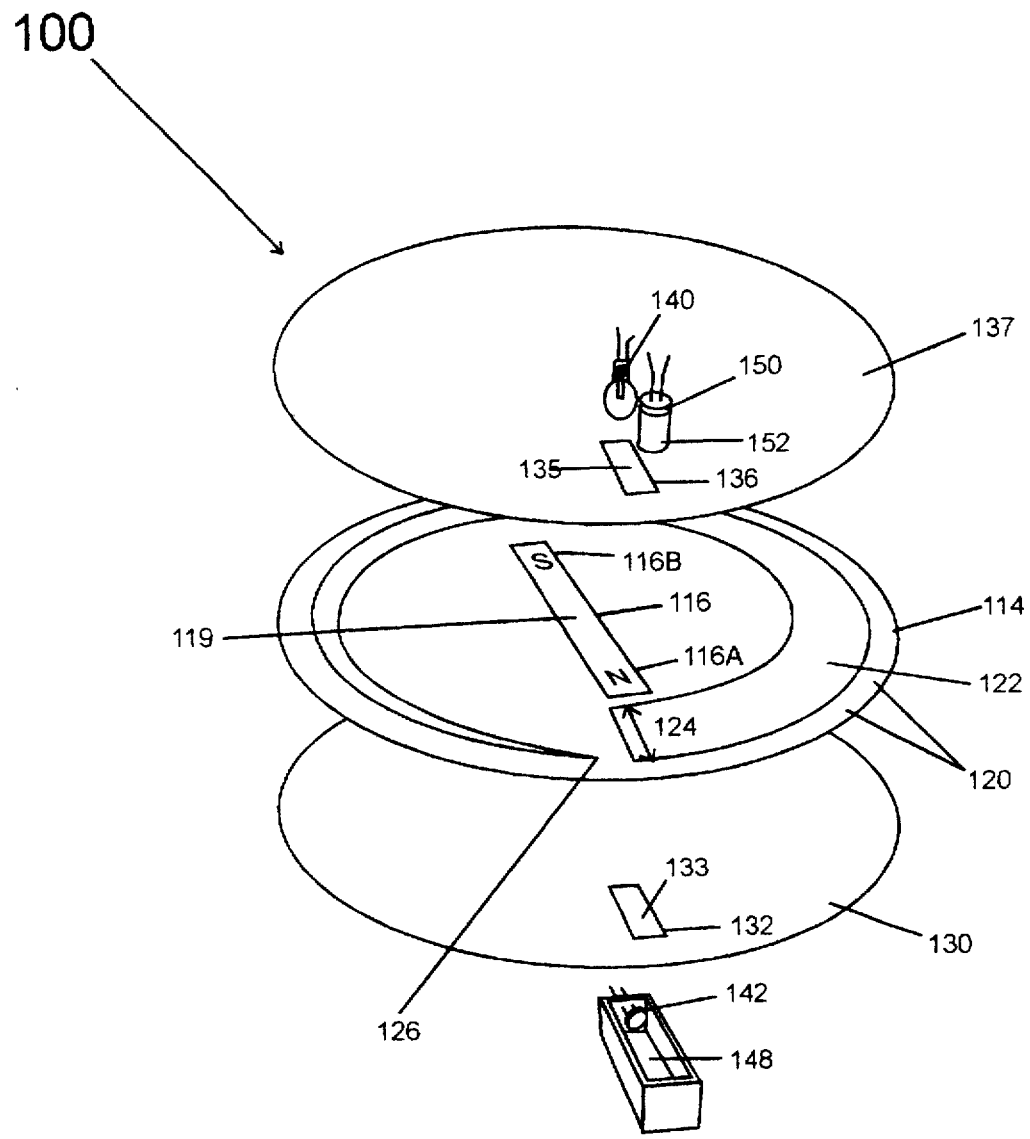
FIG. 3 presents an exploded view of the second embodiment of the invention. Illustrated is the rotatably mounted disc showing the relationship of the slot of continuously varying width and the fixed solid disk with rectangular aperture intermediate emitter-detector configuration.
Figure 4:
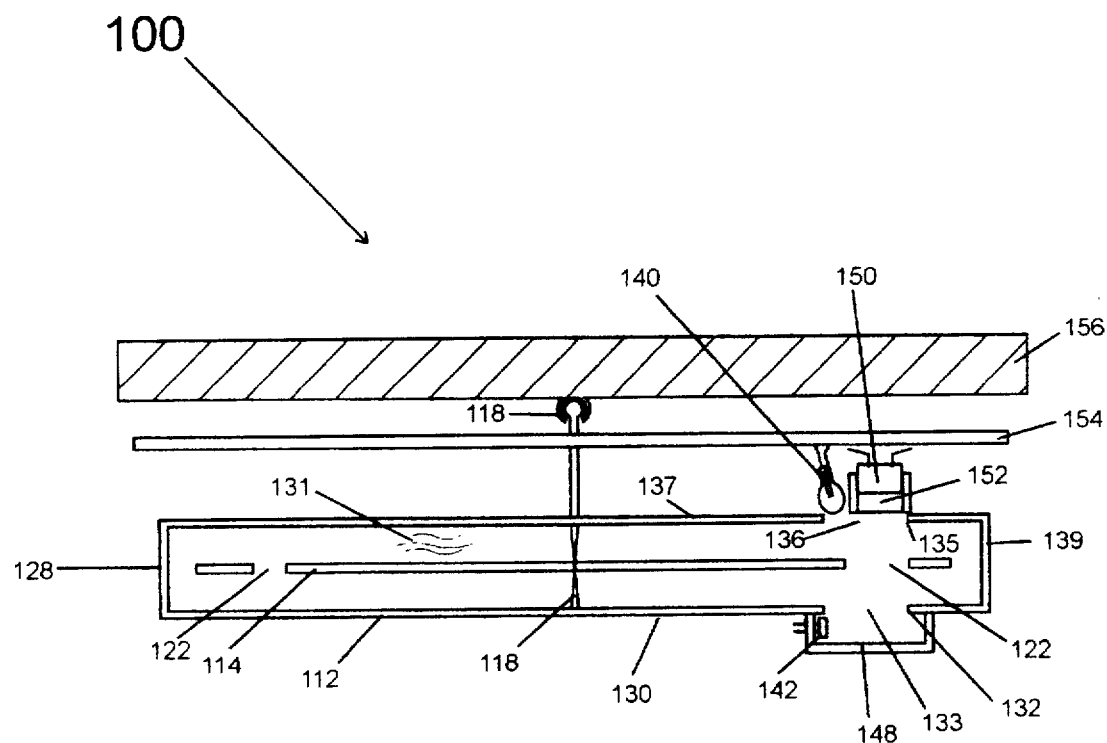
FIG. 4 presents a cross sectional view of the second embodiment illustrating a second placement of the location detector, the source emitter, the reference detector, the fluid dampened rotatably mounted disc and the compass housing.

Referring specifically now to FIGS. 3–4 the compass device 100 is shown. A housing 112 surrounds a slotted disk 114. The slotted disk 114 has an elongated permanent magnet 116 mounted thereon. The slotted disk 114 includes a mounting means 118 which would suspend the slotted disk 114 in such a fashion to permit it to freely rotate. The slotted disk has a center 119 and a circumference 120. A slot 122 is provided generally about the circumference 120 which defines a passage through the slotted disk 114. The slot 122 has a maximum width 124 and a minimum width 126. The slot 122 varies in width as the slot 122 circumscribes the circumference 120 of the slotted disk 114. No two slot 122 widths are the same and the width becomes smaller from the maximum width 124 to the minimum width 126. The slot 122 approximates the shape of an ouroboros or an elongated triangular element which has been scribed about the circumference of the slotted disk 114.

The permanent magnet 116 has a north direction 116A and a south position 116B. The magnet 116 may be orientated in such a fashion where the north direction 116A is facing the point of maximum width 124 on the slot 122 in a radial fashion.

The slotted disk 114 is centrally supported inside a cylindrical inner housing 128. The mounting means 118 permits free rotation of the slotted disk 114. The cylindrical inner housing 128 has a bottom element 130 is fixed below the slotted disk 114. The bottom element 130 is equivalent geometrically to the slotted disk 114, and shares an equivalent radius, circumference, diameter etc. A first aperture 132 is located on the bottom element 130. The first aperture 132 is rectangular and is orientated radially on the bottom element 130, the aperture's minimum rectangular dimension being approximately parallel to the circumference of the bottom element 130. The first aperture 132 length is equivalent to the maximum width 124 of the slot 122.

The inner housing 128 forms a chamber which is filled with a fluid 131. The fluid 131 is surrounded by a bottom element 130, a top element 137 and a side element 139 forming a cylindrical chamber. The fluid 131 damps the rotation of the slotted disk 114. The fluid 131 is also transparent to the emission, i.e. the fluid 131 permits the transmission of the emission without significantly degrading the emission's intensity. A first transparent membrane 133 covers the first rectangular aperture 132.

A second transparent membrane 135 covers a second aperture 136 located on the top element 137 of the inner housing 128. The second aperture 136 is also approximately rectangular, and has an appropriate orientation, preferably radially with its lesser dimension parallel to the circumference of the cylindrical inner housing 128. The greater dimension would approximate that of the maximum width 124 of the slot 122.

An emission source 140 is located above the top element 137. This emission source 140 may be any suitable source which would induce excitation of a fluorescent material 148. The fluorescent material 148 is a generally rectangular panel. A first detector 142 is proximal the emission source 148. The first detector 142 may be collimated. The first detector 142 produces a reference value which relates to the unattenuated emission intensity of the fluorescent radiation. The first detector 142 is chosen to be susceptible to the detection of fluorescent radiation. The first detector 142 will generate a unattenuated signal which will be used as a reference value for fluorescent emission intensity prior to attenuation. The function of the first detector 142 is to provide this reference intensity signal for comparison to the attenuated signal. Such a unattenuated signal is to correct for changes in emission intensity with time due to battery drain, ambient temperature, or other physical conditions which may alter the inherent emission intensity.

The slotted disk 114, bottom element 130, as well as the top aperture 136 and the bottom aperture 132 lay intermediate the emission source 140 and the fluorescent panel 148. The emission source 140 generates an emission which passes through the emission passage and falls incident on the fluorescent panel 148. The fluorescent panel 148 is excited by the emission, emitting a fluorescent radiation. The excited fluorescent panel 148 acts as a general area source producing a generally uniform radiation intensity reflection across its area. This emitted fluorescent radiation will be detected by the second detector 150. The second detector 150 is fixed above slot 122. A collimator 152 is proximal the second detector 150. The collimator 152 collimates the attenuated emission from the fluorescent panel 148 and channels the collimated, attenuated portion of the fluorescent emission into the second detector 150. The collimator 152 also insures that stray emanations other than those from the fluorescent panel 148 do not interfere with the disk location determination. The emission is first rectangularly attenuated by the aperture 132 located on the bottom element 130. The emission is further attenuated by the slot 122 of the slotted disk 114. As the slotted disk 114 rotates due to the interaction of the elongated permanent magnet 116 with an external magnetic field, the slot 122 moves in relation to the second detector 150. As the slot 122 width varies with the slot 122 position about the circumference, different amounts of the emission are attenuated as a function of slotted disk 114 position. The second detector 150 produces a signal representing an attenuated value which relates to the attenuated emission intensity.

Element 154 relates to a standard circuit board. Element 156 relates to an outer housing for the device.

The comparison of the reference value with the attenuated value gives directional information and will be discussed below in greater detail.

It is to be understood that means to power an appropriate emission source 140, such as batteries for a radiation source, have been considered desirable.

THIRD EMBODIMENT

The third embodiment discusses the use of a diffuse reflector 248 providing a generally uniform intensity radiation reflection. The emission source 240 is located below the slotted disk 214 and proximal the diffuse reflector 248.

Figure 5:
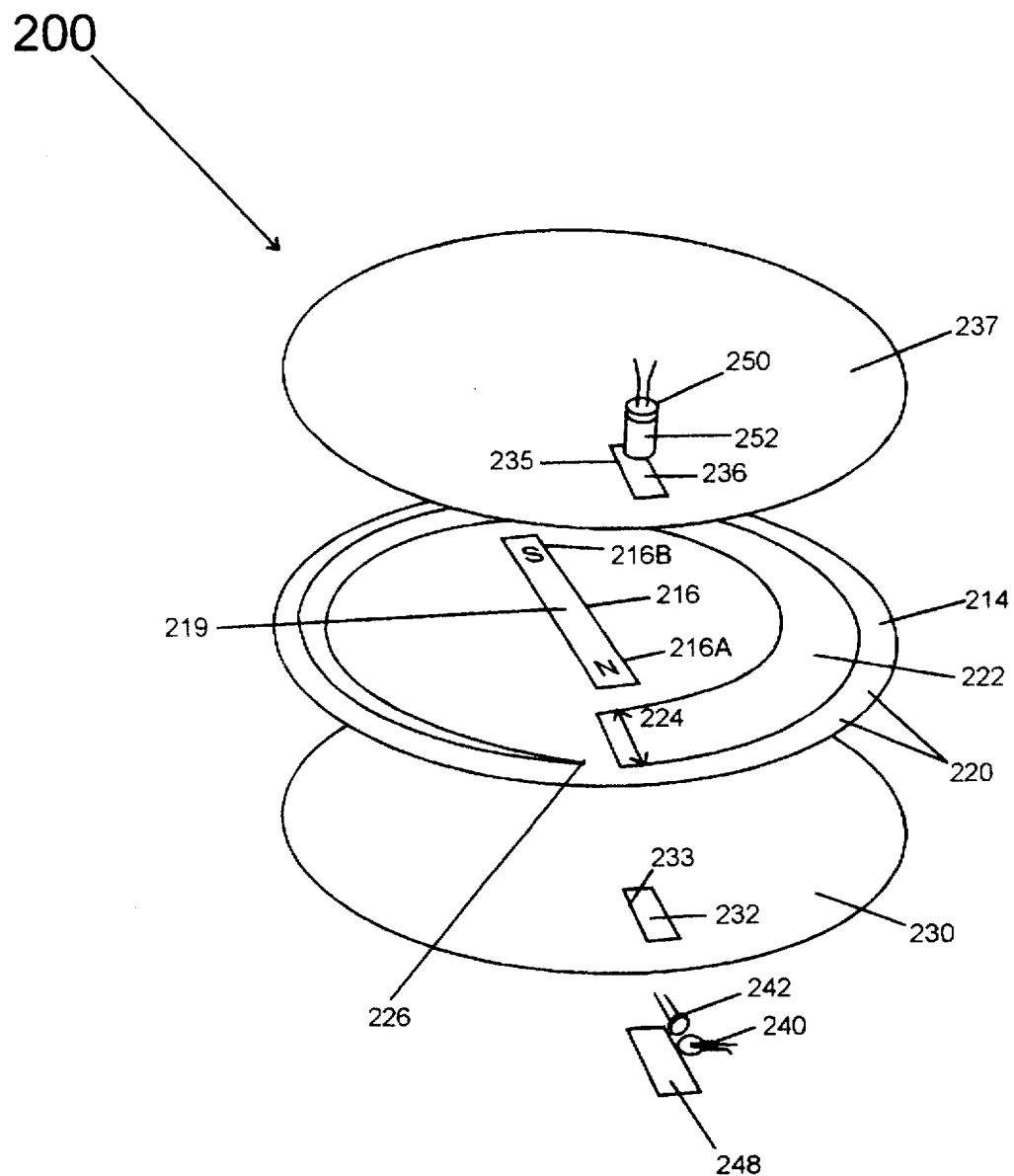
FIG. 5 presents an exploded view of the third embodiment of the invention. Illustrated is the rotatably mounted disc showing the relationship of the slot of continuously varying width and the fixed solid disk with rectangular aperture intermediate emitter-detector configuration.
Figure 6:
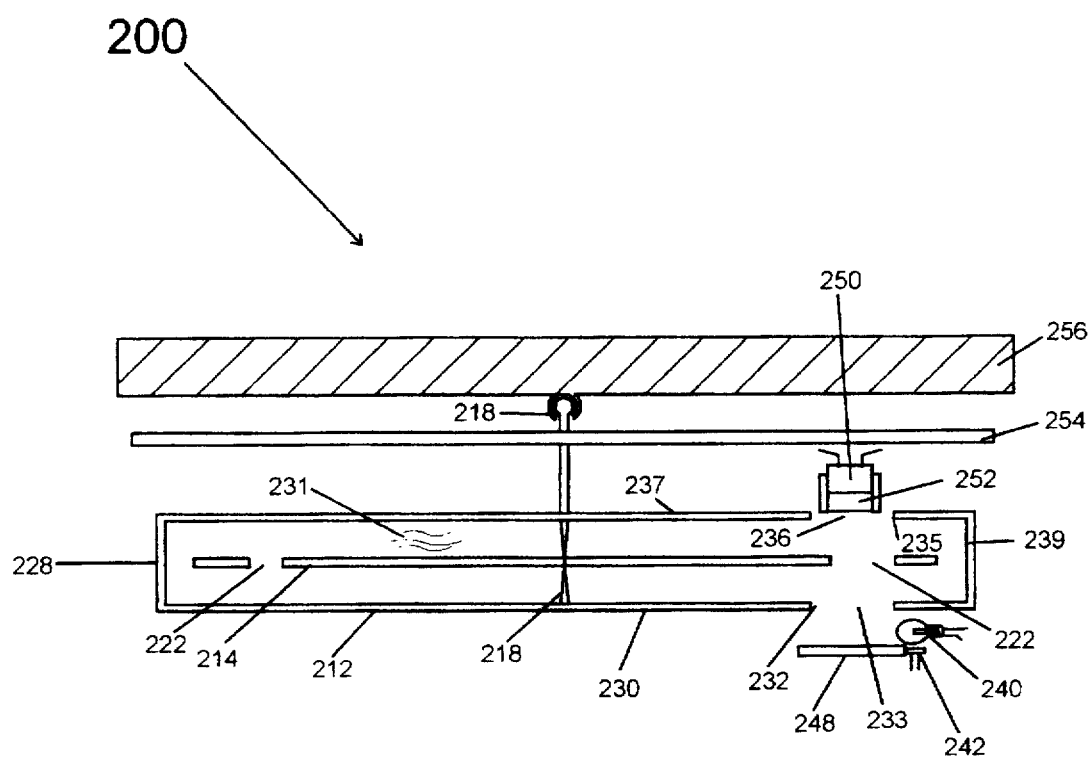
FIG. 6 presents a cross sectional view of the third embodiment illustrating a third placement of the location detector, the source emitter, the reference detector, the fluid dampened rotatably mounted disc and the compass housing.

Referring specifically now to FIGS. 5–6 the compass device 200 is shown. A housing 212 surrounds a slotted disk 214. The slotted disk 214 has an elongated permanent magnet 216 mounted thereon. The slotted disk 214 includes a mounting means 218 which would suspend the slotted disk in such a fashion to permit it to freely rotate. The slotted disk has a center 219 and a circumference 220. A slot 222 is provided generally about the circumference 220 which defines a passage through the slotted disk 214. The slot 222 has a maximum width 224 and a minimum width 226. The slot 222 varies in width as the slot 222 circumscribes the circumference 220 of the slotted disk 214. No two slot 222 widths are the same and the width becomes smaller from the maximum width 224 to the minimum width 226. The slot 222 approximates the shape of an ouroboros or an elongated triangular element which has been scribed about the circumference of the slotted disk 214.

The permanent magnet 216 has a north direction 216A and a south position 216B. The magnet 216 may be orientated in such a fashion where the north direction 216A is facing the point of maximum width 224 on the slot 222 in a radial fashion.

The slotted disk 214 is centrally supported inside a cylindrical inner housing 228. The mounting means 218 permits free rotation of the slotted disk 214. The cylindrical inner housing 228 has a bottom element 230 is fixed below the slotted disk 214. The bottom element 230 is equivalent geometrically to the slotted disk 214, and shares an equivalent radius, circumference, diameter etc. A first aperture 232 is located on the bottom element 230. The first aperture 232 is rectangular and is orientated radially on the bottom element 230, the aperture's minimum rectangular dimension being approximately parallel to the circumference of the bottom element 230. The first aperture 232 length is equivalent to the maximum width 224 of the slot 222.

The inner housing 228 forms a chamber which is filled with a fluid 231. The fluid 231 is surrounded by a bottom element 230, a top element 237 and a side element 239 forming a cylindrical chamber. The fluid 231 damps the rotation of the slotted disk 214. The fluid 231 is also transparent to the emission, i.e. the fluid 231 permits the transmission of the emission without significantly degrading the emission's intensity. A first transparent membrane 233 covers the first rectangular aperture 232.

A second transparent membrane 235 covers a second aperture 236 located on the top element 237 of the inner housing 228. The second aperture 236 is also approximately rectangular, and has an appropriate orientation, preferably radially with its lesser dimension parallel to the circumference of the cylindrical inner housing 228. The greater dimension would approximate that of the maximum width 224 of the slot 222.

An emission source 240 is located below above the bottom element 230. The emission source 240 is proximal with diffuse reflector 248. This emission source 240 may be a radioactive source, a light source, a laser source, an infrared or near infrared source, or any other known emission source. A first detector 242 is proximal the emission source 240. The first detector 242 may be collimated. The first detector 242 produces a reference value which relates to the unattenuated emission intensity. The first detector 242 may be a radiation detector, a laser detector, an infrared or near infrared detector, or any other appropriate detector device, such as a charged coupled device. The first detector 242 is chosen in such a manner to permit detection of the emission source 240. The first detector 242 will generate a unattenuated signal which will be used as a reference value for emission intensity prior to attenuation. The function of the first detector 242 is to provide this reference intensity signal for comparison to the attenuated signal. Such a unattenuated signal is to correct for changes in emission intensity with time due to battery drain, ambient temperature, or other physical conditions which may alter the inherent emission intensity.

The slotted disk 214, bottom element 230, as well as the top aperture 236 and the bottom aperture 232 lay intermediate the emission source 240—diffuse reflector 248 combination, and the second detector 250. The diffuse reflector 248 is a rough surface reflector and does not reflect light specularly. Rather, the diffuse reflector 248 acts as a general area source producing a generally uniform radiation intensity reflection across an area. This diffuse reflection will be detected by the second detector 250. The second detector 250 is fixed above slot 222. A collimator 252 may be provided proximal the second detector 250. The collimator 252 collimates the attenuated emission from the diffuse reflector 248 and channels the collimated, attenuated portion of the emission into the second detector 250. The collimator 252 also insures that stray emanations other than those from the reflected emission source do not interfere with the disk location determination. The reflected emission is first rectangularly attenuated by the aperture 232 located on the bottom element 230. The reflected emission is further attenuated by the slot 222 of the slotted disk 214. As the slotted disk 214 rotates due to the interaction of the elongated permanent magnet 216 with an external magnetic field, the slot 222 moves in relation to the second detector 250. As the slot 222 width varies with the slot 222 position about the circumference, different amounts of the emission are attenuated as a function of slotted disk 214 position. The second detector 250 produces a signal representing an attenuated value which relates to the attenuated emission intensity.

Element 254 relates to a standard circuit board. Element 256 relates to an outer housing for the device.

The comparison of the reference value with the attenuated value gives directional information and will be discussed below in greater detail.

It is to be understood that means to power an appropriate emission source 240, such as batteries for a radiation source, have been considered desirable. Also, a light bulb which may be detected by a cadmium sulfide photoresisitive detector may be employed, both of these elements are susceptible to extremely low cost and are currently commercially available. Solar power has been to determined to be an appropriate power source for several of the embodiments included herein.

FOURTH EMBODIMENT

The fourth embodiment discusses the use of a fluorescent source 348 providing a generally uniform intensity radiation emission due to excitation by the emission source 340. The emission source 340 is located below the slotted disk 314 and proximal the fluorescent source 348.

Figure 7:
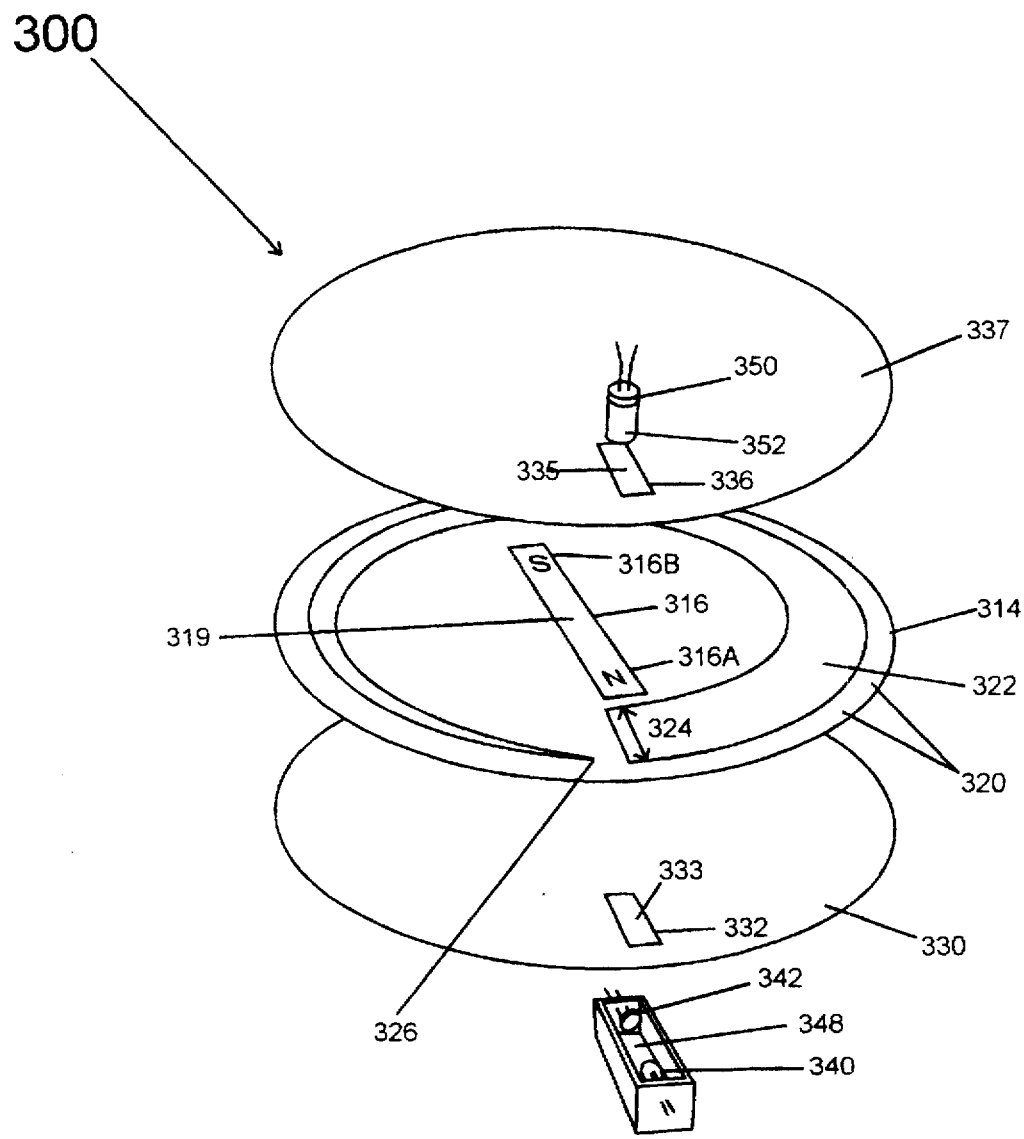
FIG. 7 presents an exploded view of the fourth embodiment of the invention. Illustrated is the rotatably mounted disc showing the relationship of the slot of continuously varying width and the fixed solid disk with rectangular aperture intermediate emitter-detector configuration.
Figure 8:
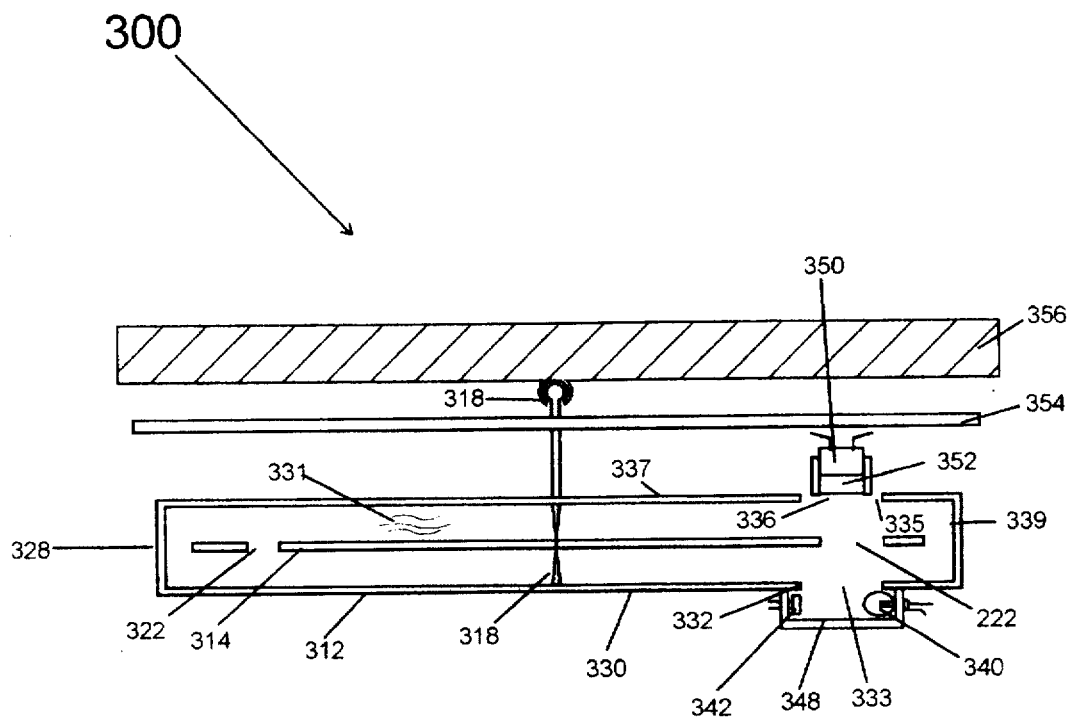
FIG. 8 presents a cross sectional view of the fourth embodiment illustrating a fourth placement of the location detector, the source emitter, the reference detector, the fluid dampened rotatably mounted disc and the compass housing.

Referring specifically now to FIGS. 7–8 the compass device 300 is shown. A housing 312 surrounds a slotted disk 314. The slotted disk 314 has an elongated permanent magnet 316 mounted thereon. The slotted disk 314 includes a mounting means 318 which would suspend the slotted disk 314 in such a fashion to permit it to freely rotate. The slotted disk has a center 319 and a circumference 320. A slot 322 is provided generally about the circumference 320 which defines a passage through the slotted disk 314. The slot 322 has a maximum width 324 and a minimum width 326. The slot 322 varies in width as the slot 322 circumscribes the circumference 320 of the slotted disk 314. No two slot 322 widths are the same and the width becomes smaller from the maximum width 324 to the minimum width 326. The slot 322 approximates the shape of an ouroboros or an elongated triangular element which has been scribed about the circumference of the slotted disk 314.

The permanent magnet 316 has a north direction 316A and a south position 316B. The magnet 316 may be orientated in such a fashion where the north direction 316A is facing the point of maximum width 324 on the slot 322 in a radial fashion.

The slotted disk 314 is centrally supported inside a cylindrical inner housing 328. The mounting means 318 permits free rotation of the slotted disk 314. The cylindrical inner housing 328 has a bottom element 330 is fixed below the slotted disk 314. The bottom element 330 is equivalent geometrically to the slotted disk 314, and shares an equivalent radius, circumference, diameter etc. A first aperture 332 is located on the bottom element 330. The first aperture 332 is rectangular and is orientated radially on the bottom element 330, the aperture's minimum rectangular dimension being approximately parallel to the circumference of the bottom element 330. The first aperture 332 length is equivalent to the maximum width 324 of the slot 322.

The inner housing 328 forms a chamber which is filled with a fluid 331. The fluid 331 is surrounded by a bottom element 330, a top element 337 and a side element 339 forming a cylindrical chamber. The fluid 331 damps the rotation of the slotted disk 314. The fluid 331 is also transparent to the emission, i.e. the fluid 331 permits the transmission of the emission without significantly degrading the emission's intensity. A first transparent membrane 333 covers the first rectangular aperture 332.

A second transparent membrane 335 covers a second aperture 336 located on the top element 337 of the inner housing 328. The second aperture 336 is also approximately rectangular, and has an appropriate orientation, preferably radially with its lesser dimension parallel to the circumference of the cylindrical inner housing 328. The greater dimension would approximate that of the maximum width 324 of the slot 322.

An emission source 340 is located below the bottom element 330. This emission source 340 may be any suitable source which would induce excitation of a fluorescent material 348. The fluorescent material 348 is a generally rectangular panel. A first detector 342 is proximal the emission source 348. The first detector 342 may be collimated. The first detector 342 produces a reference value which relates to the unattenuated emission intensity of the fluorescent radiation. The first detector 342 is chosen to be susceptible to the detection of fluorescent radiation. The first detector 342 will generate a unattenuated signal which will be used as a reference value for fluorescent emission intensity prior to attenuation. The function of the first detector 342 is to provide this reference intensity signal for comparison to the attenuated signal. Such a unattenuated signal is to correct for changes in emission intensity with time due to battery drain, ambient temperature, or other physical conditions which may alter the inherent emission intensity.

The slotted disk 314, bottom element 330, as well as the top aperture 336 and the bottom aperture 332 lay intermediate the fluorescent panel 348 and the second fluorescent detector 350. The emission source 340 generates an emission which falls incident on the fluorescent panel 348. The fluorescent panel 348 is excited by the emission, emitting a fluorescent radiation. The excited fluorescent panel 348 acts as a general area source producing a generally uniform radiation intensity reflection across its area. This emitted fluorescent radiation will be detected by the second detector 350. The second detector 350 is fixed above slot 322. A collimator 352 is proximal the second detector 350. The collimator 352 collimates the attenuated emission from the fluorescent panel 348 and channels the collimated, attenuated portion of the fluorescent emission into the second detector 350. The collimator 352 also insures that stray emanations other than those from the fluorescent panel 348 do not interfere with the disk location determination. The emission is first rectangularly attenuated by the aperture 332 located on the bottom element 330. The emission is further attenuated by the slot 322 of the slotted disk 314. As the slotted disk 314 rotates due to the interaction of the elongated permanent magnet 316 with an external magnetic field, the slot 322 moves in relation to the second detector 350. As the slot 322 width varies with the slot 322 position about the circumference, different amounts of the emission are attenuated as a function of slotted disk 314 position. The second detector 350 produces a signal representing an attenuated value which relates to the attenuated emission intensity.

Element 354 relates to a standard circuit board. Element 356 relates to an outer housing for the device.

The comparison of the reference value with the attenuated value gives directional information and will be discussed below in greater detail.

It is to be understood that means to power an appropriate emission source 340, such as batteries, have been considered.

FIFTH EMBODIMENT

The fifth embodiment discusses the use of a tritium source 448 providing a generally uniform intensity radiation emission. Tritium is a radioactive isotope of hydrogen and is produced by the bombardment of deuterons with deuterons. Tritium is placed in a lattice of material which emits an attenuatable emission when in the presence of tritium decay by-products, primarily beta particles. In this case, the tritium acts as a primary emission source which is located below the slotted disk 414 and is integral with the lattice of beta particle excitable material which provides secondary emissions recieved by the detector. The beta particle excitable material is chosen to emit a generally uniform intensity radiation emission such as a fluorescent emission in response to the tritium's beta emission.

Figure 9:
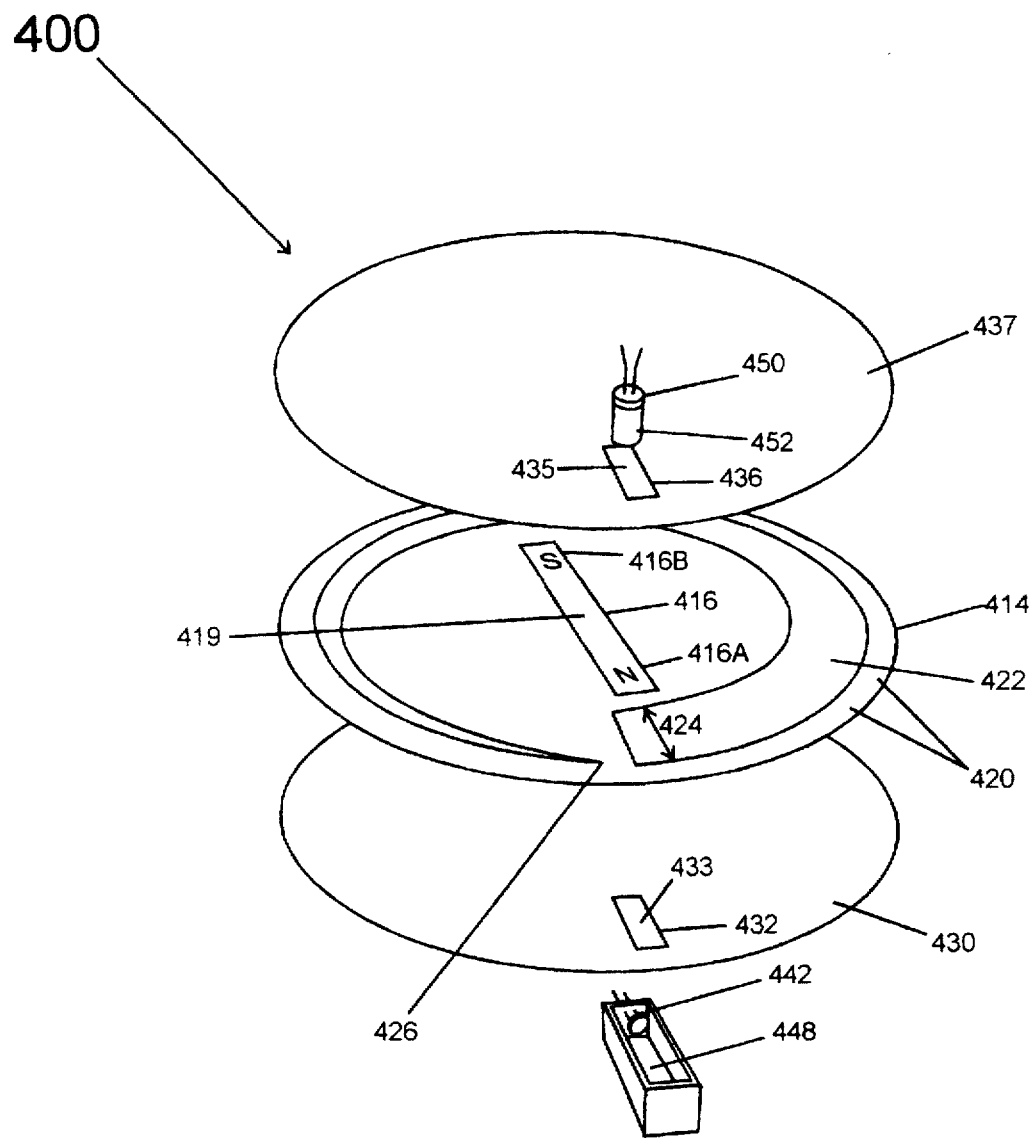
FIG. 9 presents an exploded view of the fifth embodiment of the invention. Illustrated is the rotatably mounted disc showing the relationship of the slot of continuously varying width and the fixed solid disk with rectangular aperture intermediate emitter-detector configuration.
Figure 10:
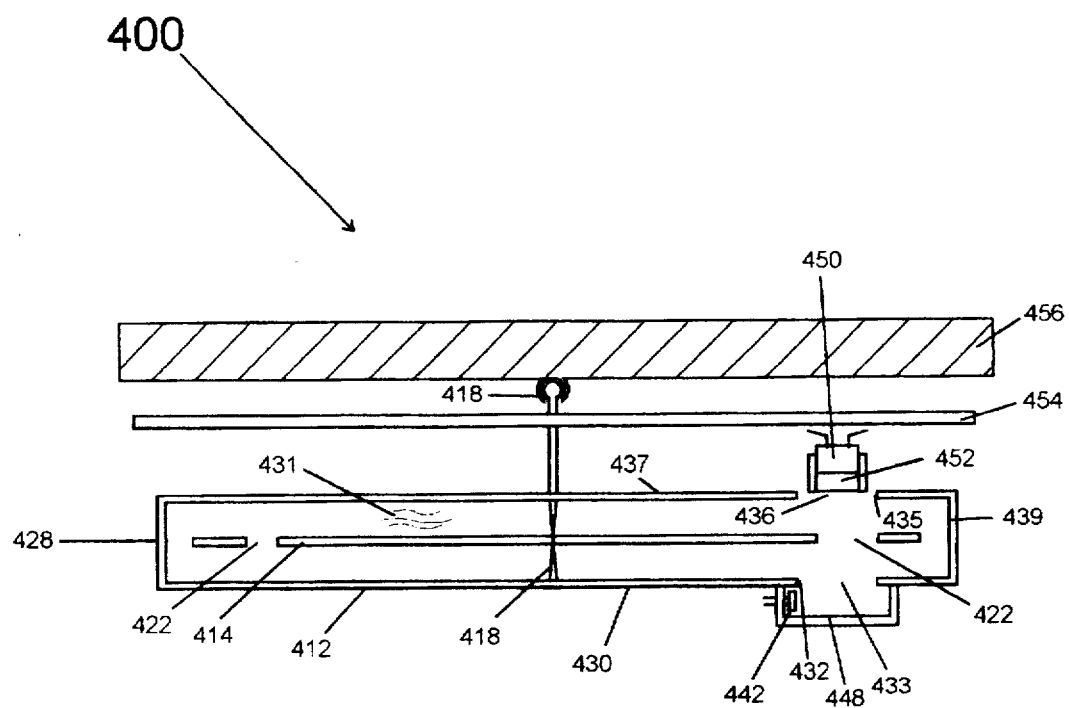
FIG. 10 presents a cross sectional view of the fifth embodiment illustrating a fifth placement of the location detector, the source emitter, the reference detector, the fluid dampened rotatably mounted disc and the compass housing.

Referring specifically now to FIGS. 9–10 the compass device 400 is shown. A housing 412 surrounds a slotted disk 414. The slotted disk 414 has an elongated permanent magnet 416 mounted thereon. The slotted disk 414 includes a mounting means 418 which would suspend the slotted disk 414 in such a fashion to permit it to freely rotate. The slotted disk has a center 419 and a circumference 420. A slot 422 is provided generally about the circumference 420 which defines a passage through the slotted disk 414. The slot 422 has a maximum width 424 and a minimum width 426. The slot 422 varies in width as the slot 422 circumscribes the circumference 420 of the slotted disk 414. No two slot 422 widths are the same and the width becomes smaller from the maximum width 424 to the minimum width 426. The slot 422 approximates the shape of an ouroboros or an elongated triangular element which has been scribed about the circumference of the slotted disk 414.

The permanent magnet 416 has a north direction 416A and a south position 416B. The magnet 416 may be orientated in such a fashion where the north direction 416A is facing the point of maximum width 424 on the slot 422 in a radial fashion.

The slotted disk 414 is centrally supported inside a cylindrical inner housing 428. The mounting means 418 permits free rotation of the slotted disk 414. The cylindrical inner housing 428 has a bottom element 430 is fixed below the slotted disk 414. The bottom element 430 is equivalent geometrically to the slotted disk 414, and shares an equivalent radius, circumference, diameter etc. A first aperture 432 is located on the bottom element 430. The first aperture 432 is rectangular and is orientated radially on the bottom element 430, the aperture's minimum rectangular dimension being approximately parallel to the circumference of the bottom element 430. The first aperture 432 length is equivalent to the maximum width 424 of the slot 422.

The inner housing 428 forms a chamber which is filled with a fluid 431. The fluid 431 is surrounded by a bottom element 430, a top element 437 and a side element 439 forming a cylindrical chamber. The fluid 431 damps the rotation of the slotted disk 414. The fluid 431 is also transparent to the emission, i.e. the fluid 431 permits the transmission of the emission without significantly degrading the emission's intensity. A first transparent membrane 433 covers the first rectangular aperture 432.

A second transparent membrane 435 covers a second aperture 436 located on the top element 437 of the inner housing 428. The second aperture 436 is also approximately rectangular, and has an appropriate orientation, preferably radially with its lesser dimension parallel to the circumference of the cylindrical inner housing 428. The greater dimension would approximate that of the maximum width 424 of the slot 422.

An tritium source distributed in a lattice of beta particle excitable material 448 is located below the bottom element 430. This beta particle excitable material will be referred to as BPE. The BPE 448 is a generally rectangular panel and emits a fluorescent radiation when in the presence of beta particles. A first detector 442 is proximal the BPE 448. The first detector 442 may be collimated. The first detector 442 produces a reference value which relates to the unattenuated emission intensity of the BPE 448 fluorescent radiation. The first detector 442 is chosen to be susceptible to the detection of fluorescent radiation. The first detector 442 will generate a unattenuated signal which will be used as a reference value for fluorescent emission intensity prior to attenuation. The function of the first detector 442 is to provide this reference intensity signal for comparison to the attenuated signal. Such a unattenuated signal is to correct for changes in emission intensity with time due to inherent tritium decay, ambient temperature, or other physical conditions which may alter the inherent emission intensity.

The slotted disk 414, bottom element 430, as well as the top aperture 436 and the bottom aperture 432 lay intermediate the BPE panel 448 and the second fluorescent detector 450. The tritium as a natural course of its decay emits a beta particle. The beta particle essentially is an electron travelling near the speed of light. The beta particle decay of tritium causes an excitation of the BPE panel 448 causing a fluorescent emission. The excited fluorescent panel 448 acts as a general area source producing a generally uniform radiation intensity reflection across its area. This emitted fluorescent radiation will be detected by the second detector 450. The second detector 450 is fixed above slot 422. A collimator 452 is proximal the second detector 450. The collimator 452 collimates the attenuated emission from the fluorescent panel 448 and channels the collimated, attenuated portion of the fluorescent emission into the second detector 450. The collimator 452 also insures that stray emanations other than those from the fluorescent panel 448 do not interfere with the disk location determination. The emission is first rectangularly attenuated by the aperture 432 located on the bottom element 430. The emission is further attenuated by the slot 422 of the slotted disk 414. As the slotted disk 414 rotates due to the interaction of the elongated permanent magnet 416 with an external magnetic field, the slot 422 moves in relation to the second detector 450. As the slot 422 width varies with the slot 422 position about the circumference, different amounts of the emission are attenuated as a function of slotted disk 414 position. The second detector 450 produces a signal representing an attenuated value which relates to the attenuated emission intensity.

Element 454 relates to a standard circuit board. Element 456 relates to an outer housing for the device.

The comparison of the reference value with the attenuated value gives directional information and will be discussed below in greater detail.

Figure 11:
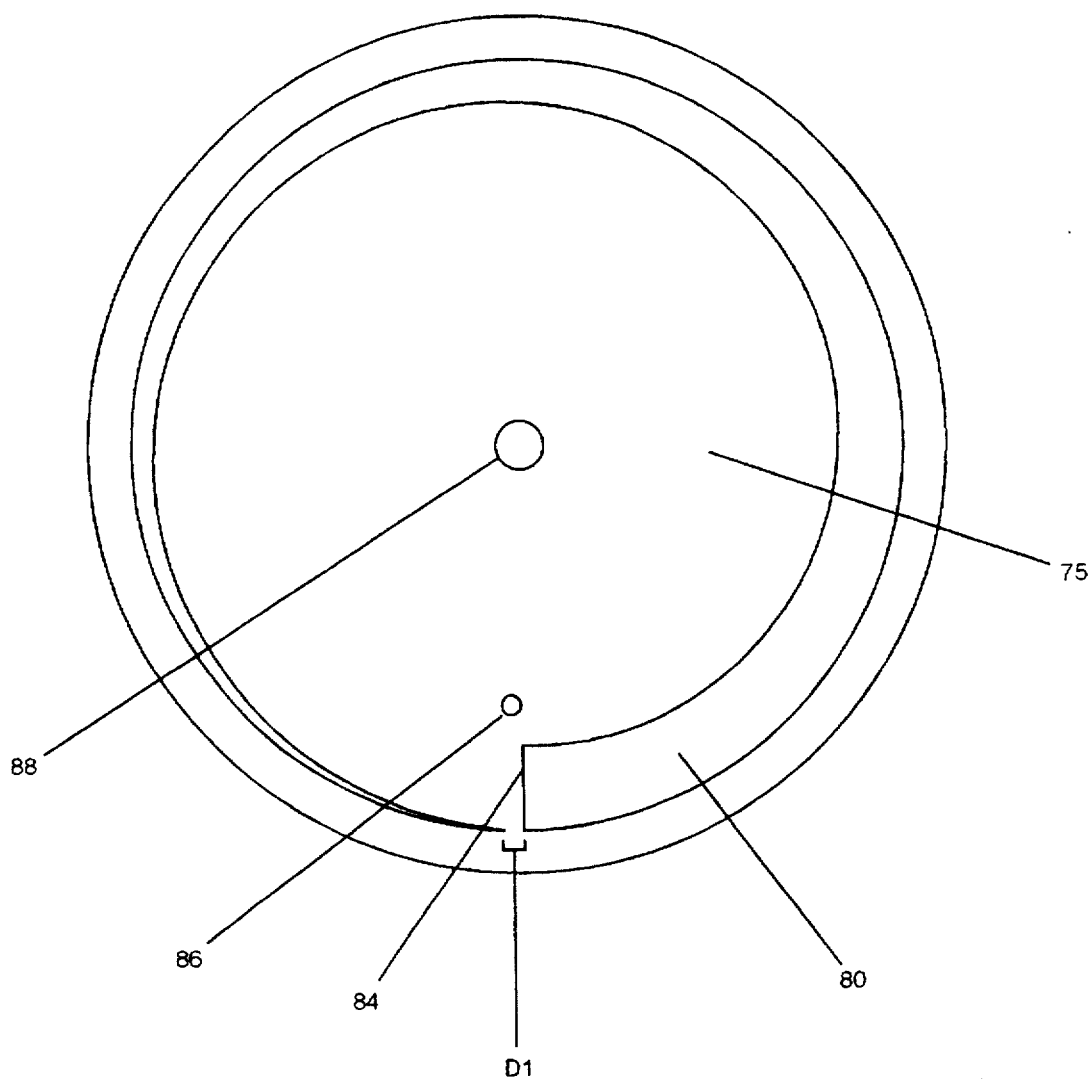
FIG. 11 presents a view of the compass card showing the single ouroboros embodiment.

FIG. 11 discloses the slotted disk 75 with the ouroboros 80 present about the disk's circumference. The ouroboros 80 has a tail 82 and a head 84. The tail 82 and the head 84 are separated by a first distance D1. This discontinuity in the ouroboros 80 may provide a signal which can be misinterpreted by the angle calculation logic. To prevent this, a discontinuity detection means 86 is provided on the radial line between D1 and the center 88 of the disk 75. This includes an aperture in the disk with a detector means located below. When the detection means has an emission falling incident upon it above a certain intensity, the angle calculation logic will know that the disk is at the discontinuity.

Figure 12:
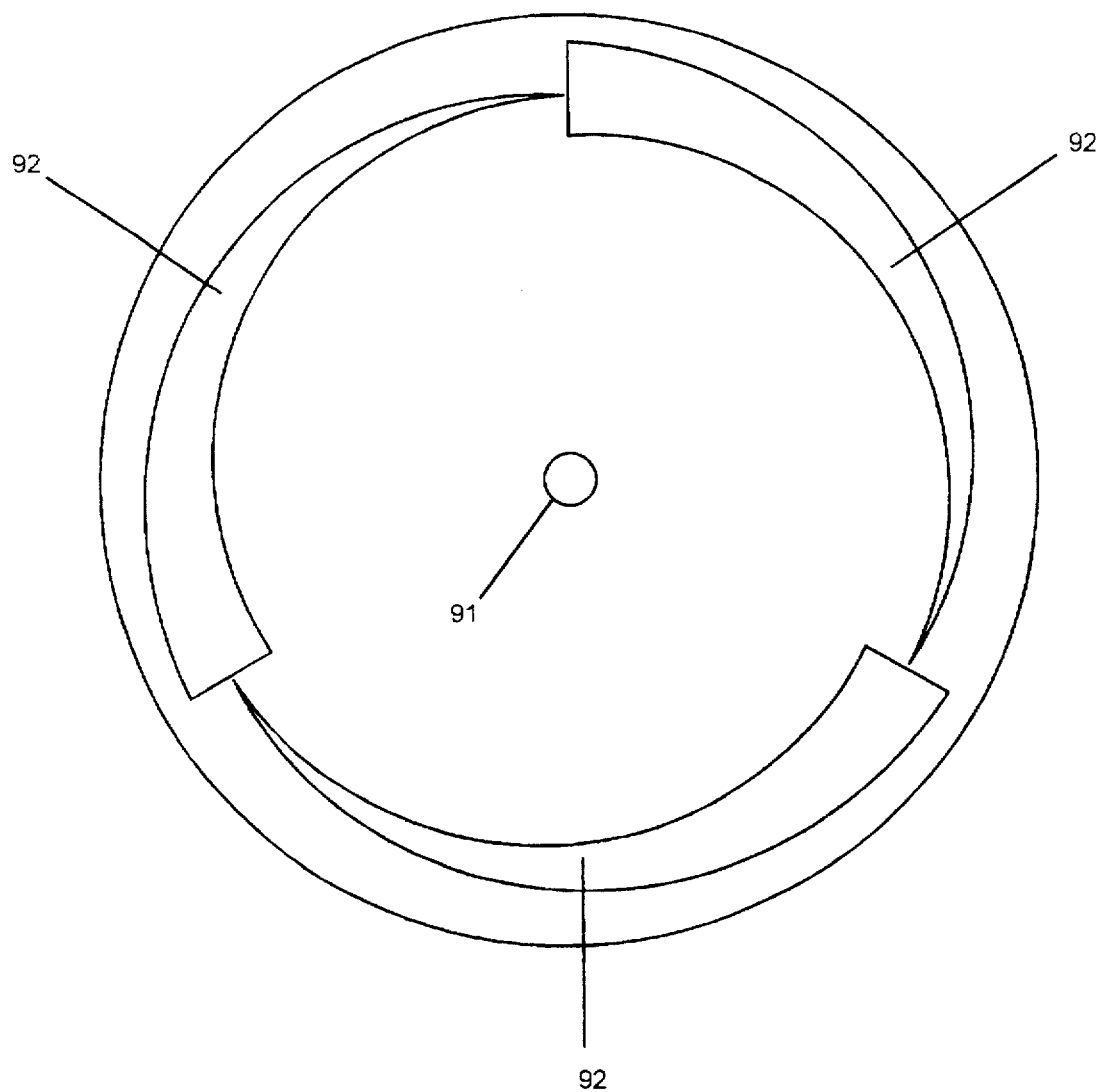
FIG. 12 presents a view of one embodiment of a compass card showing a possible multiple co-circumferencial ouroboros configuration.
Figure 13:
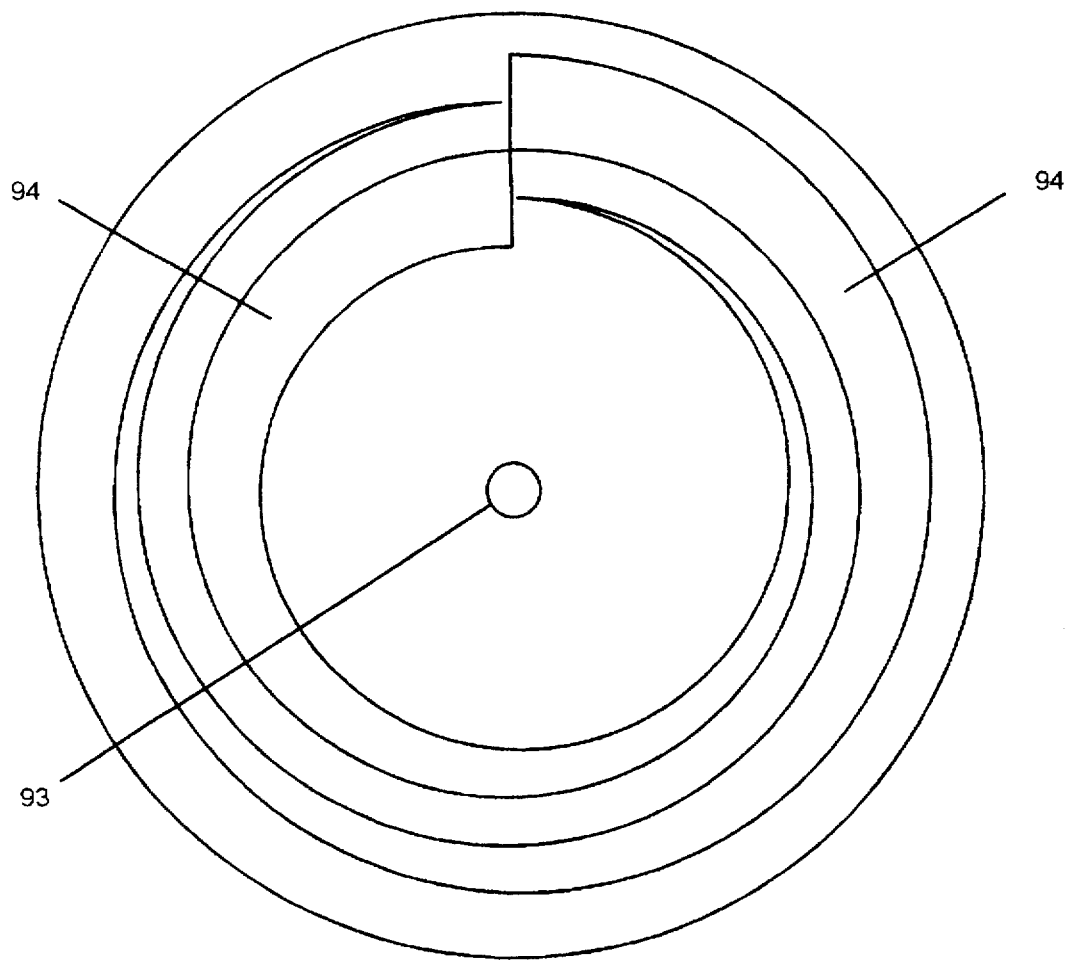
FIG. 13 presents a view of one embodiment of a compass card showing a possible multiple concentric ouroboros configuration.
Figure 14:
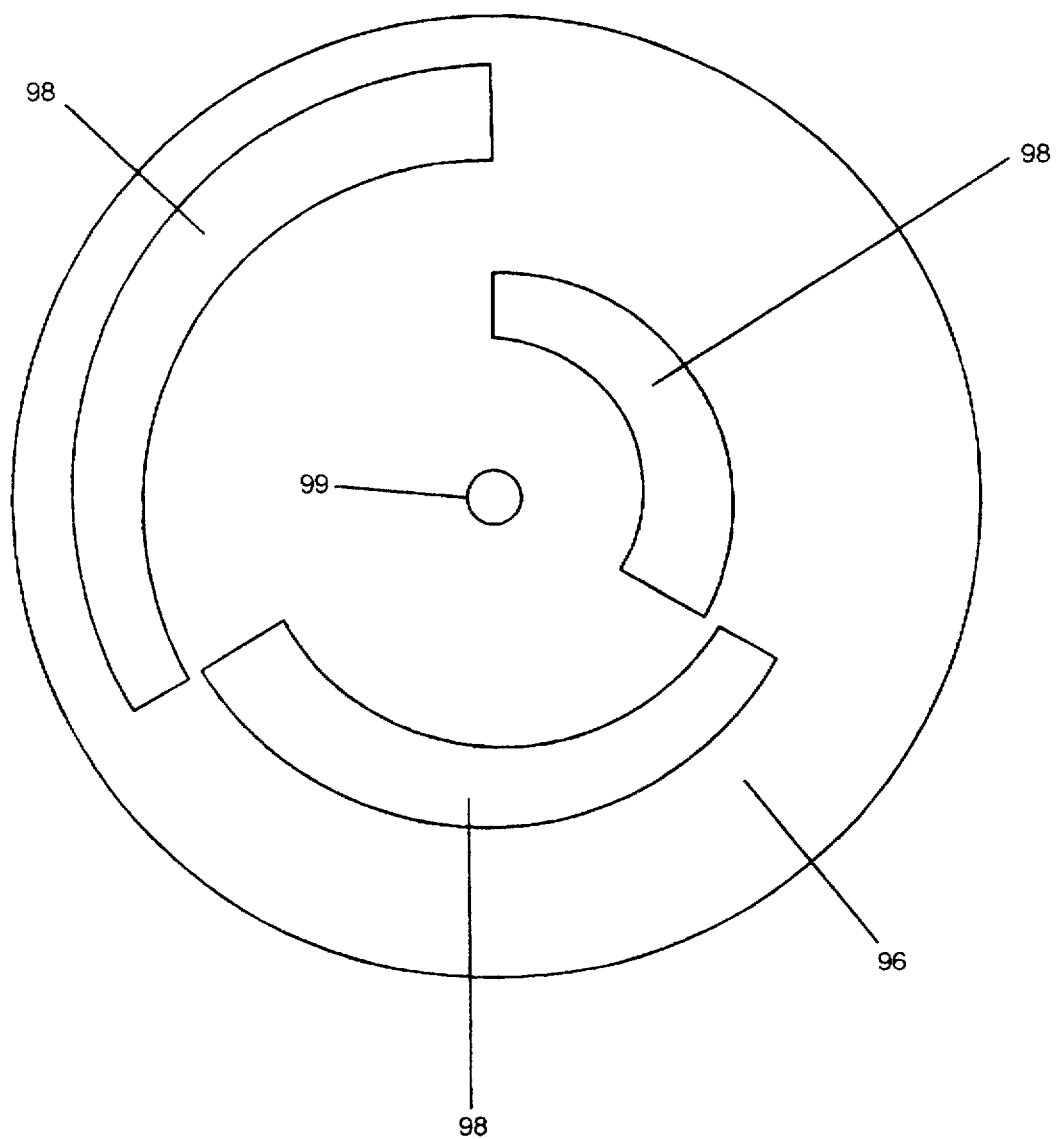
FIG. 14 presents a view of one embodiment of a compass card showing a possible multiple concentric truncated ouroboros configuration.

FIGS. 12–14 show different possible slotted disk configurations. Referring now specifically to FIG. 12, three co-circumferencial ouroboros slots 92 are shown. This may be employed to increase the ability of the compass to determine a specific angle. It has been shown that n ouroboros slots will increase angular resolution n times. A central aperture 91 is provided to permit free rotation of the disk.

FIG. 13 shows two concentric ouroboros slots 94. It will be understood that when utilizing the multiple concentric ouroboros slots 94, that additional detector-emitter suites will be required in a one to one ratio. Again, it has been shown that n ouroboros slots will increase angular resolution n times. A central aperture 93 is provided to permit free rotation of the disk.

FIG. 14 discloses a disk 96 embodiment with multiple slots 98 thereon. The multiple slots 98 are truncated ouroboros slots with the head and tail removed. The slots 98 generally follow nested circumference patterns on the disk. A central aperture 99 is provided to permit free rotation of the disk. Such a disk 96 will have advantage in certain applications.

Figure 15:
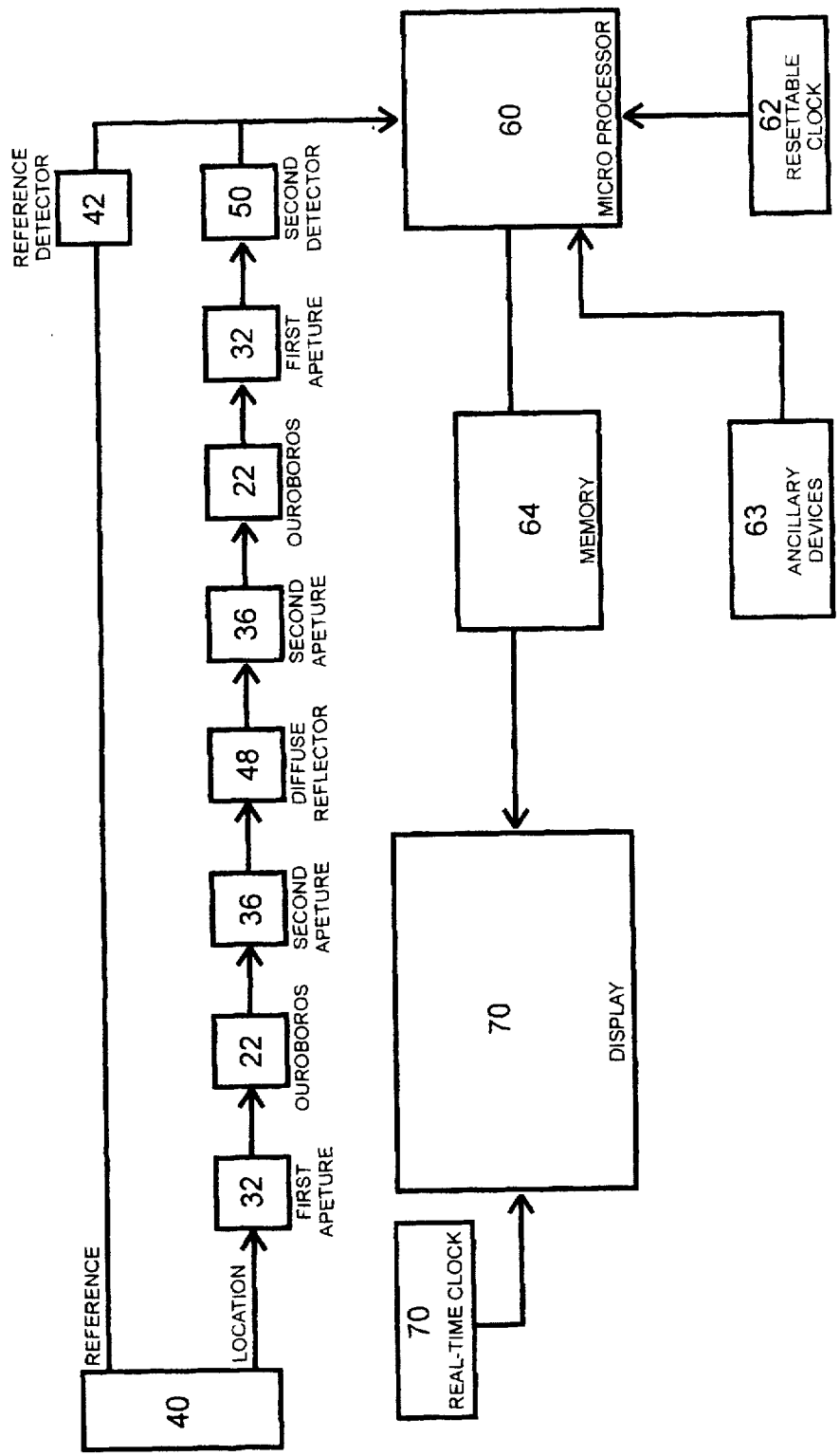
FIG. 15 presents a block diagram which discloses the different components and the emission path, including attenuation logic, of the first embodiment compass device.

Referring now specifically to FIG. 15, a block diagram is presented which relates various components of the compass device with reference to the first embodiment as discussed with respect to FIGS. 1 & 2. It will be understood that a block diagram for all the embodiments, including appropriate emission attenuation geometry, may be easily provided with the transfers of components to their appropriate locations.

A microprocessor 60 processes the attenuated signal generated by the second detector 50, and the non-attenuated or reference signal generated by the first detector 42. A resettable clock 62 provides a time signal of certain duration. The microprocessor 60 will evaluate the signals and store conditioned information into a memory storage device 64. Ancillary devices 63 provide other information to the microprocessor 60. The ancillary devices include, but are not limited to, distance measuring devices, digital pedometer outputs, wheel revolution counters, pressure transducers, pitot tube digital output, and other devices. The conditioned signals from the compass herein conform to instant directional information, and devices have been considered where previous signals are stored, such conditioned signals conform to previous directional information. Through simple processing the precise directional orientation as well as other parameters such as path travelled may be determined. A display face 70 will display current direction, and may present other data to allow the user to return to the point of origin. Any other information may also be presented according to the ancillary devices employed. A real-time clock device 72 also may have its output displayed on the display face 70. The microprocessor 60 may be replaced by processing circuitry, such as circuits which employ boolean logic. Any appropriate calculating means may be employed, including one which interacts with a memory in order to reproduce a path travelled.

In certain applications of the above disclosed invention, a path travelled as well as the instantaneous direction may be desired. Calibration is accomplished by obtaining the maximum location signal in a pre-determined direction. The microprocessor 60 receives both the reference signal and the location signal when the maximum location detector signal is obtained. For example, by design, the maximum signal is obtained by orienting the compass apparatus 10 to Magnetic North. A ratio of the two signals is then calculated:

$$R_N = I_{max}/I_r$$

where $R_N$ is the calculated ratio for the intensity of magnetic North. $I_r$ is the intensity of the reference signal and $I_{max}$ is the maximum obtainable location detector signal from Detector 1, at magnetic North. Magnetic North, by convention, is taken to be both 0 and 360 degrees with the angle increasing in value moving clockwise around a circle from 0 degrees at Magnetic North to 360 degrees, again, at Magnetic North.

An unknown direction corresponds to a known measured intensity, $I_u$, and a new reference intensity, $I'$, measure simultaneously. The determination is made by pointing the compass in the forward direction indicated on the housing. The new reference signal for that observation determines the corrected $I_{max}$:

$$I'_{max} = I' \times R_N$$

The position is then determined from 0 to 359 degrees. Hence, 360 minus 360 divided by the corrected maximum intensity times the unknown intensity:

$$P_x = 360 - (360/I'_{max}) \times I_u$$

where $P_x$ is the location in degrees relative to the clockwise direction, with magnetic North as both 0 and 360 degrees.

It is recognized that random sampling errors occur in obtaining the intensity values. For both calibration and unknown direction determination the microprocessor 60 will automatically take at least three samples, a few seconds apart, while the user is pointing the compass housing in the direction indicated. These samples will be averaged by the microprocessor 60 to provide a single reading and a standard deviation. These will be stored in memory 64 and displayed on display face 70. The standard deviation will be used to provide the user with an error estimate of the positional indication, such as the 95% confidence limit for the unknown direction. The determination of sampling error is well known and is not further discussed here. In addition to the unknown direction the direction opposite of that determined will also be displayed for user convenience. The electronics and microprocessor technology required to accomplish these calculations are well known. Also, illustrated in FIG. 15 is a real-time clock 72 which will display correct time. The real-time clock 72 is may be accessed when readings are taken and results are stored in memory 64 along with the time taken. A resettable clock 62 can function as a stop watch to store time intervals between readings for navigation purposes.

Although not illustrated, the compass device will have a readout including a display face for the presentation of information which will be determined and calculated by the compass, as well as information which may be provided from the ancillary devices. Such readouts would be employed if one desired to retrace the path the user travelled. With the information stored and available for recall the user can sketch on paper or on a map the path traveled by employing standard dead reckoning methods. Using well known navigation methods, travelled paths so determined can be retraced within the precision of the apparatus disclosed herein. The intrinsic uncertainty and accuracy of the compass and factors which effect it's readings are well known hence not further detailed here.

It is apparent from the above that the present invention accomplishes all of the objectives set forth by providing a new and improved, low cost, orientation device with a digital output, which is sensitive to an external magnetic field, the device having simple circuitry and logic.

With respect to the above description, it should be realized that the optimum dimensional relationships for the parts of the invention, to include variations in size, materials, shape, form, function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiment of the invention, it will be apparent to those of ordinary skill in the art that many modifications thereof may be made without departing from the principles and concepts set forth herein. Hence, the proper scope of the present invention should be determined only by the broadest interpretation of the appended claims so as encompass all such modifications and equivalents.

I claim:

1. A compass device for determining direction relative to an external magnetic field comprising:

an emitting means having an emission, said emission having a first intensity, a first detection means; said first detection means proximal to said emitting means, said first detection means detecting said first intensity, a second detection means, said second detection means proximal to said emitting means, a freely rotatable disk, said disk intermediate said emitting means and a diffuse reflector means, said disk having a magnet mounted thereon, said disk being generally circular, including a center and a circumference, said disk having a position relative to the external magnetic field, said disk including a slot, said slot proximal to the circumference and defining a passage through said disk, said passage having a width, said width varying continuosly about the circumference, said passage permits a portion of said emission to propagate therethrough, where it is diffusely reflected, said reflected portion having a second intensity, said second intensity detected by said second detection means, whereby said first detection means generates a first signal proportional to said first intensity, and said second detection means generates a second signal proportional to said second intensity, wherein the ratio of said second signal to said first signal may be conditioned to give said disk position relative to the external magnetic field.

2. The compass device as claimed in claim 1 wherein said reflected portion is a generally uniform intensity emission.

3. The compass device as claimed in claim 1 wherein said first detection means and said second detection means is a cadmium sulfide detector.

4. The compass device as claimed in claim 1 wherein said first and second detection means is selected from the group of cadmium sulfide detectors, radiation detectors, laser detectors, infrared detectors, near infrared detectors, or fluorescence detectors.

5. A compass device for determining direction relative to an external magnetic field comprising:

an emitting means proximal a second detection means, said emitting means having an emission, a fluorescent material proximal a first detection means, a freely rotatable disk, said disk intermediate said emitting means and said fluorescent material, said disk having a magnet mounted thereon, said disk being generally circular, including a center and a circumference, said disk having a position relative to the external magnetic field, said disk including a slot, said slot proximal to the circumference and defining a passage through said disk, said passage having a width, said width varying continuously about the circumference, said passage permits said emission to propagate therethrough, where it falls on said fluorescent material, causing a said material to emit a fluorescent emission, said fluorescent emission having a first intensity, said first intensity detected by said first detection means, said passage permits a portion of said fluorescent emission to propagate therethrough, said portion having a second intensity, said second intensity being detected by said second detection means, whereby said first detector means generates a first signal proportional to said first intensity, and said second detection means generates a second signal proportional to said second intensity, wherein the ratio of said second signal to said first signal may be conditioned to give said disk position relative to the external magnetic field.

6. The compass device as claimed in claim 5 wherein said fluorescent emission is a generally uniform intensity emission.

7. The compass device as claimed in claim 5 wherein said first and second detection means is a fluorescent emission detector.

8. A compass device for determining direction relative to an external magnetic field comprising:

a second detection means, an emitting means, said emitting means having an emission, a fluorescent material proximal a first detection means, said fluorescent material proximal said emitting means, a freely rotatable disk, said disk intermediate said emitting means and said second detection means, said disk having a magnet mounted thereon, said disk being generally circular, including a center and a circumference, said disk having a position relative to the external magnetic field, said disk including a slot, said slot proximal to the circumference and defining a passage through said disk, said passage having a width, said width varying continuously about the circumference, said emission falls on said fluorescent material, causing said fluorescent material to emit a fluorescent emission, said fluorescent emission having a first intensity, said first intensity detected by said first detection means, said passage permits a portion of said fluorescent emission to propagate therethrough, said portion having a second intensity, said second intensity being detected by said second detection means, whereby said first detection means generates a first signal proportional to said first intensity, and said second detector means generates a second signal proportional to said second intensity, wherein the ratio of said second signal to said first signal may be conditioned to give said disk position relative to the external magnetic field.

9. The compass device as claimed in claim 8 wherein said fluorescent emission is a generally uniform intensity emission.

10. The compass device as claimed in claim 8 wherein said first and second detection means is a fluorescent emission detector.

11. A compass device for determining direction relative to an external magnetic field comprising:

an emitting means having an emission, a detector means; said detector means proximal said emitting means, an area source means, a freely rotatable disk, said disk intermediate said detector means and said area source means, said disk having a magnet mounted thereon, said disk having a position relative to the external magnetic field, said disk including a slot, said slot proximal to the circumference of said disk, further defining a passage through said disk, said passage having a width, said width varying continuously about the circumference, said passage permits said emission to propagate therethrough, said emission falling incident on said area source, said area source generating a second emission in response to said emission, said passage further permits a portion of said second emission to propagate therethrough, said portion being detected by said detector means, whereby said detector means generates a first signal proportional to said disk position relative to the external magnetic field.

12. The compass device as claimed in claim 11 wherein said second emission is a generally uniform intensity emission.

13. The compass device as claimed in claim 11 wherein said area source is a diffuse reflector.

14. The compass device as claimed in claim 11 wherein said area source is a fluorescent material.

15. The compass device as claimed in claim 11 wherein said detector means is a cadmium sulfide detector.

16. The compass device as claimed in claim 11 wherein said detector means is selected from the group of cadmium sulfide detectors, radiation detectors, laser detectors, infrared detectors, near infrared detectors, or fluorescence detectors.

17. A compass device for determining direction relative to an external magnetic field comprising:

an emitting means having an emission, a detector means;

an area source means; said area source means proximal said emitting means, a freely rotatable disk, said disk intermediate said detecting means and said area source means, said disk having a magnet mounted thereon, said disk having a position relative to the external magnetic field, said disk including a slot, said slot proximal to the circumference of said disk, further defining a passage through said disk, said passage having a width, said width varying continuously about the circumference, said emission falling incident on said area source, said area source generating a second emission in response to said emission, said passage permits a portion of said second emission to propagate therethrough, said portion being detected by said detector means, whereby said detector means generates a first signal proportional to said disk position relative to the external magnetic field.

18. A compass device for determining direction relative to an external magnetic field comprising:

a second detection means, an emitting means, said emitting means having an emission, said emission having a first intensity, said first intensity detected by a first detection means, a diffuse reflector means proximal said emitting means, a second detection means, a freely rotatable disk, said disk intermediate said diffuse reflector and said second detection means, said disk having a magnet mounted thereon, said disk being generally circular, including a center and a circumference, said disk having a position relative to the external magnetic field, said disk including a slot, said slot proximal to the circumference and defining a passage through said disk, said passage having a width, said width varying continuously about the circumference, said emission falls on said diffuse reflector where it is diffusely reflected, said reflected portion being attenuated by said disk, said attenuated portion having a second intensity, said second intensity detected by said second detection means, whereby said first detection means generates a first signal proportional to said first intensity, and said second detection means generates a second signal proportional to said second intensity, wherein the ratio of said second signal to said first signal may be conditioned to give said disk position relative to the external magnetic field.

19. The compass device as claimed in claim 18 wherein said fluorescent emission is a generally uniform intensity emission.

20. The compass device as claimed in claim 18 wherein said first and second detection means is a fluorescent emission detector.

* * * * *